(12) United States Patent
Privett et al.

(10) Patent No.: US 9,486,988 B2
(45) Date of Patent: Nov. 8, 2016

(54) REDUCED CYCLE TIME MANUFACTURING PROCESSES FOR THICK FILM RESISTIVE DEVICES

(71) Applicant: Watlow Electric Manufacturing Company, St. Louis, MO (US)

(72) Inventors: Angie Privett, Hannibal, MO (US);
Roger Brummell, Hannibal, MO (US);
Larry Forbis, New London, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 324 days.

(21) Appl. No.: 14/022,949

(22) Filed: Sep. 10, 2013

(65) Prior Publication Data

US 2014/0014265 A1     Jan. 16, 2014

Related U.S. Application Data

(62) Division of application No. 11/779,745, filed on Jul. 18, 2007, now Pat. No. 8,557,082.

(51) Int. Cl.
| | |
|---|---|
| *B32B 37/10* | (2006.01) |
| *H01C 17/06* | (2006.01) |
| *H05B 3/26* | (2006.01) |
| *H05B 3/46* | (2006.01) |

(52) U.S. Cl.
CPC .............. *B32B 37/10* (2013.01); *H01C 17/06* (2013.01); *H05B 3/262* (2013.01); *H05B 3/265* (2013.01); *H05B 3/46* (2013.01); *H05B 2203/003* (2013.01); *H05B 2203/013* (2013.01); *H05B 2203/017* (2013.01)

(58) Field of Classification Search
CPC .................... B29C 66/81455; B29C 43/3642; B29C 70/44; B29C 51/28; B32B 37/10; B30B 1/003

See application file for complete search history.

(56) References Cited

U.S. PATENT DOCUMENTS

| | | |
|---|---|---|
| 3,648,218 A | 3/1972 | Kellerman |
| 3,806,098 A | 4/1974 | Clough |
| 3,845,443 A | 10/1974 | Fisher |
| 3,880,609 A | 4/1975 | Caddock |

(Continued)

FOREIGN PATENT DOCUMENTS

| | | |
|---|---|---|
| CA | 2018113 | 2/1991 |
| EP | 720416 | 7/1996 |

(Continued)

OTHER PUBLICATIONS

International Search Report for PCT/US2008/070014 dated Jan. 14, 2009.

(Continued)

*Primary Examiner* — Christopher Schatz
(74) *Attorney, Agent, or Firm* — Burris Law, PLLC

(57) ABSTRACT

A process of forming a resistive device such as a load resistor or a heater is provided that includes forming a dielectric layer onto a substrate, a target, or an adjacent functional layer, wherein the dielectric layer in one form defines a single layer of dielectric tape. The dielectric tape is laminated to the substrate, the target, or the adjacent functional layer through a single predetermined cycle of pressure, temperature and time. A resistive layer is formed on the dielectric layer after the dielectric tape is laminated to the substrate. A protective layer is formed over the resistive layer.

9 Claims, 31 Drawing Sheets

(56) References Cited

U.S. PATENT DOCUMENTS

| | | | |
|---|---|---|---|
| 3,964,958 A | 6/1976 | Johnston | |
| 4,028,657 A | 6/1977 | Reichelt | |
| 4,072,921 A | 2/1978 | Sacchetti | |
| 4,334,850 A | 6/1982 | Garabedian | |
| 4,806,295 A | 2/1989 | Trickett et al. | |
| 5,318,647 A | 6/1994 | Mitchell | |
| 5,657,532 A | 8/1997 | Alexander et al. | |
| 5,729,814 A | 3/1998 | Suzuki et al. | |
| 5,973,296 A | 10/1999 | Juliano et al. | |
| 6,458,309 B1 * | 10/2002 | Allen | B29C 70/446 156/197 |
| 6,652,906 B1 | 11/2003 | Piinarbasi | |
| 6,712,110 B1 | 3/2004 | Nelson et al. | |
| 6,771,019 B1 | 8/2004 | Wu et al. | |
| 6,946,360 B2 | 9/2005 | Chou | |
| 7,196,295 B2 | 3/2007 | Fennewald et al. | |
| 2002/0195444 A1 | 12/2002 | Lin et al. | |
| 2005/0145617 A1 | 7/2005 | McMillin et al. | |
| 2006/0054616 A1 | 3/2006 | Ptasienski | |
| 2009/0020905 A1 | 1/2009 | Privett | |
| 2009/0021342 A1 | 1/2009 | Brummell | |

FOREIGN PATENT DOCUMENTS

| | | |
|---|---|---|
| EP | 1055978 | 11/2000 |
| GB | 1132794 | 6/1968 |
| GB | 2068173 | 5/1981 |
| GB | 2316848 | 3/1998 |
| GB | 2338632 | 12/1999 |
| JP | 57178877 | 11/1982 |
| JP | 62013285 | 1/1987 |
| JP | 2000249584 | 9/2000 |
| WO | 9803038 | 1/1998 |
| WO | 0008527 | 2/2000 |
| WO | 0111924 | 2/2001 |
| WO | 0198054 | 12/2001 |

OTHER PUBLICATIONS

"Thick Film Heaters Made from Dielectric Tape Bonded Stainless Steel Substrates", S.J. Stein, R. Wahlers, M. Heinz, M.A. Stein—Electro Science Laboratories Inc., (USA); R. Taft, R. Humphries—Agmet Ltd. (UK), Presented at IMAPS, 1995.

Piwonski, et al., Low Pressure Lamination of ceramic green tapes by gluing at room temperature; Journal of the European Ceramic Society; vol. 19, Issue 2, Feb. 1999. pp. 263-270. Retrieved from internet: URL: http://www.sciencedirect.com/science/article/pll/SO955221998001964.

International Search Report and Written Opinion—PCT/US2008/070296.

International Search Report and Written Opinion—PCT/US2009/039250.

* cited by examiner

US 9,486,988 B2

REDUCED CYCLE TIME MANUFACTURING PROCESSES FOR THICK FILM RESISTIVE DEVICES

CROSS-REFERENCE TO RELATED APPLICATIONS

This application is a divisional of U.S. patent application Ser. No. 11/779,745, filed on Jul. 18, 2007, which is related to U.S. patent application Ser. No. 11/779,703 filed on Jul. 18, 2007 and titled "Thick Film Layered Resistive Device Employing a Dielectric Tape." These applications are commonly assigned with the present application, the contents of which are incorporated herein by reference in their entirety.

FIELD

The present disclosure relates generally to thick film resistive devices such as load resistors or layered heaters, and more particularly to improved materials and structures for such thick film resistive devices.

BACKGROUND

The statements in this section merely provide background information related to the present disclosure and may not constitute prior art.

Resistive devices such as layered heaters or load resistors are typically used in applications where space is limited, when heat output needs vary across a surface, or in ultra-clean or aggressive chemical applications. A layered resistive device, such as a layered heater, generally comprises layers of different materials, namely, a dielectric and a resistive material, which are applied to a substrate. The dielectric material is applied first to the substrate and provides electrical isolation between the substrate and the resistive material and also minimizes current leakage during operation. The resistive material is applied to the dielectric material in a predetermined pattern and provides a resistive heater circuit. The layered heater also includes leads that connect the resistive heater circuit to a heater controller and an over-mold material that protects the lead-to-resistive circuit interface. Accordingly, layered load devices are highly customizable for a variety of applications.

Individual layers of the resistive devices can be formed by a variety of processes, one of which is a "thick film" layering process. The layers for thick film resistive devices are typically formed using processes such as screen printing, decal application, or film printing heads, among others. For each layer within the thick film resistive device, multiple coats or applications of the thick film material are often required to achieve the desired thickness. The processes associated with each of these coats generally involve multiple manufacturing steps and repeated cycles of high temperature firing and drying. Therefore, with a thick film resistive device having multiple layers, and each of the layers requiring multiple coats, numerous firing and drying cycles are required. As a result, processing of a thick film layered resistive device with its multiple processing steps can lead to lengthy manufacturing cycle times and increased cost.

SUMMARY

In one form, a process of forming a resistive device is provided, wherein the process includes forming a dielectric layer onto a substrate, forming a resistive layer on the dielectric layer, and forming a protective layer over the resistive layer. The dielectric layer defines a single layer of dielectric tape. The dielectric tape is laminated to the substrate through a single predetermined cycle of pressure, temperature, and time.

In another form, a process of forming a thick film material onto a target for use in a resistive device is provided. The thick film material includes at least one layer of dielectric. The thick film material is laminated to the target through a single predetermined cycle of pressure, temperature, and time.

In still another form, a process of forming a resistive device is provided that includes forming a dielectric layer onto a substrate, forming a resistive layer on the dielectric layer using a thick film layering process, and forming a protective layer over the resistive layer. The dielectric layer defines a single layer of dielectric tape. The dielectric tape is laminated to the substrate through a single predetermined cycle of pressure, temperature, and time. The protective layer comprises a single layer of dielectric tape, the dielectric tape being laminated to the resistive layer through a single predetermined cycle of pressure, temperature, and time.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 17A:
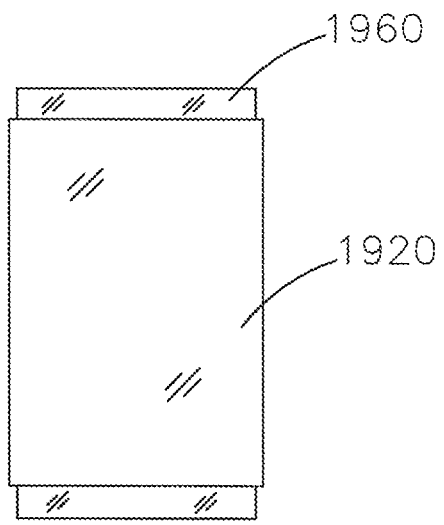
FIG. 17A is a side view of a tubular substrate having a rubber cylinder being disposed therein in accordance with still another process of the present disclosure.
Figure 17B:
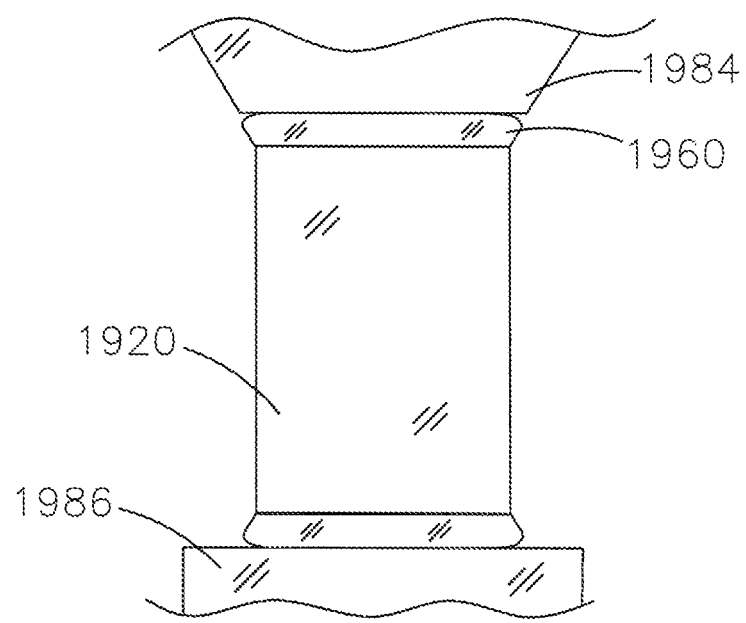
Figure 18A:
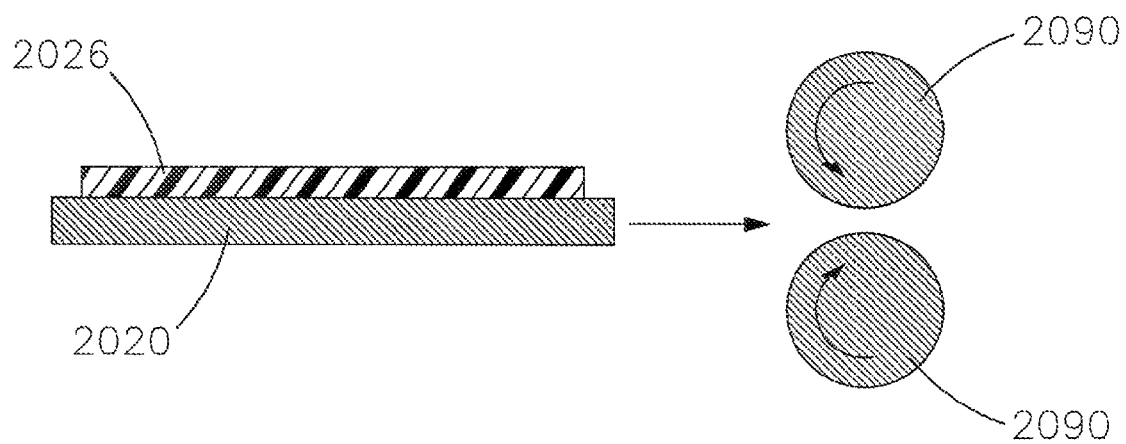
Figure 18B:
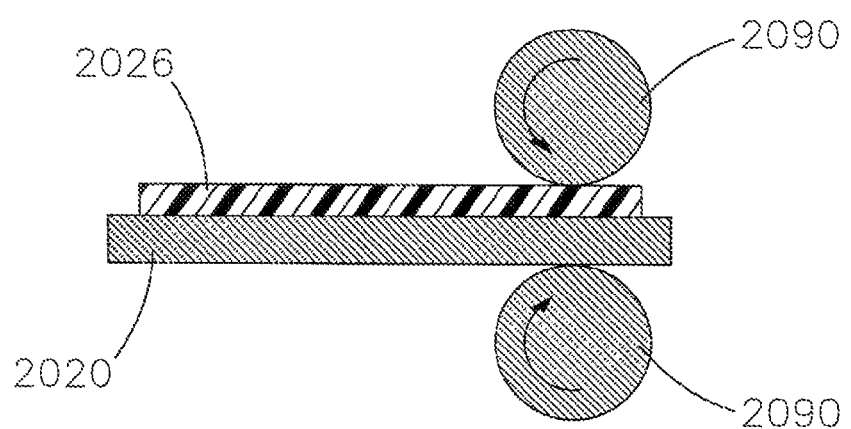

FIG. 17B is a side view of the tubular substrate and rubber cylinder of FIG. 17A, showing a press exerting a force on the rubber cylinder in accordance with the process of the present disclosure; and FIG. 18A is a schematic sectional view of a flat substrate having dielectric tape disposed thereon, the substrate and dielectric tape being disposed proximate a set of dies, in accordance with another process of the present disclosure;

FIG. 18B is a schematic sectional snap-shot view of the substrate, dielectric tape, and dies of FIG. 18A, the substrate and dielectric tape being rolled through the set of dies.

Figure 19A:
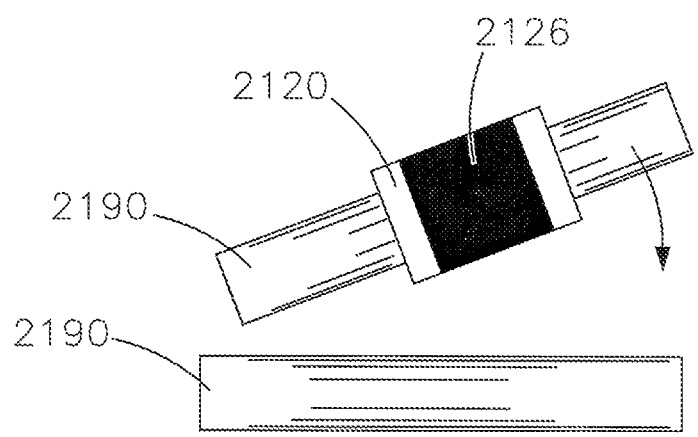
Figure 19B:
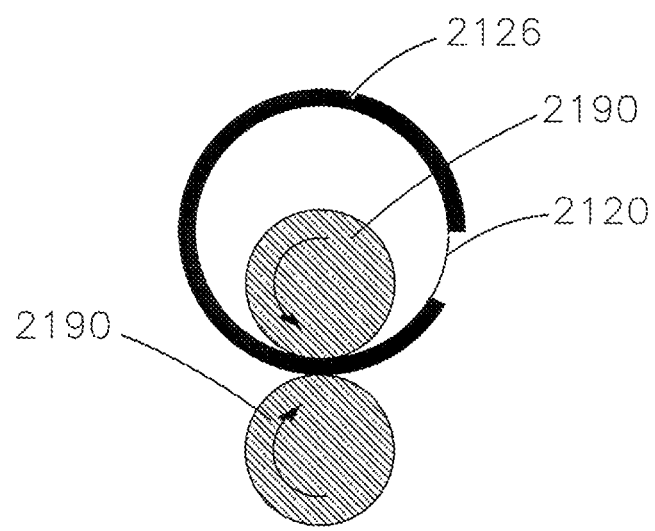

FIG. 19A is a side snap-shot view of a tubular substrate having a dielectric tape disposed thereon, the substrate being slid onto a set of dies, in accordance with a process of the present invention; and FIG. 19B is a schematic sectional snap-shot view of the substrate, dielectric tape, and dies of FIG. 19A, the substrate and dielectric tape being rolled through the set of dies.

DETAILED DESCRIPTION

The following description is merely exemplary in nature and is not intended to limit the present disclosure, application, or uses.

Figure 1:
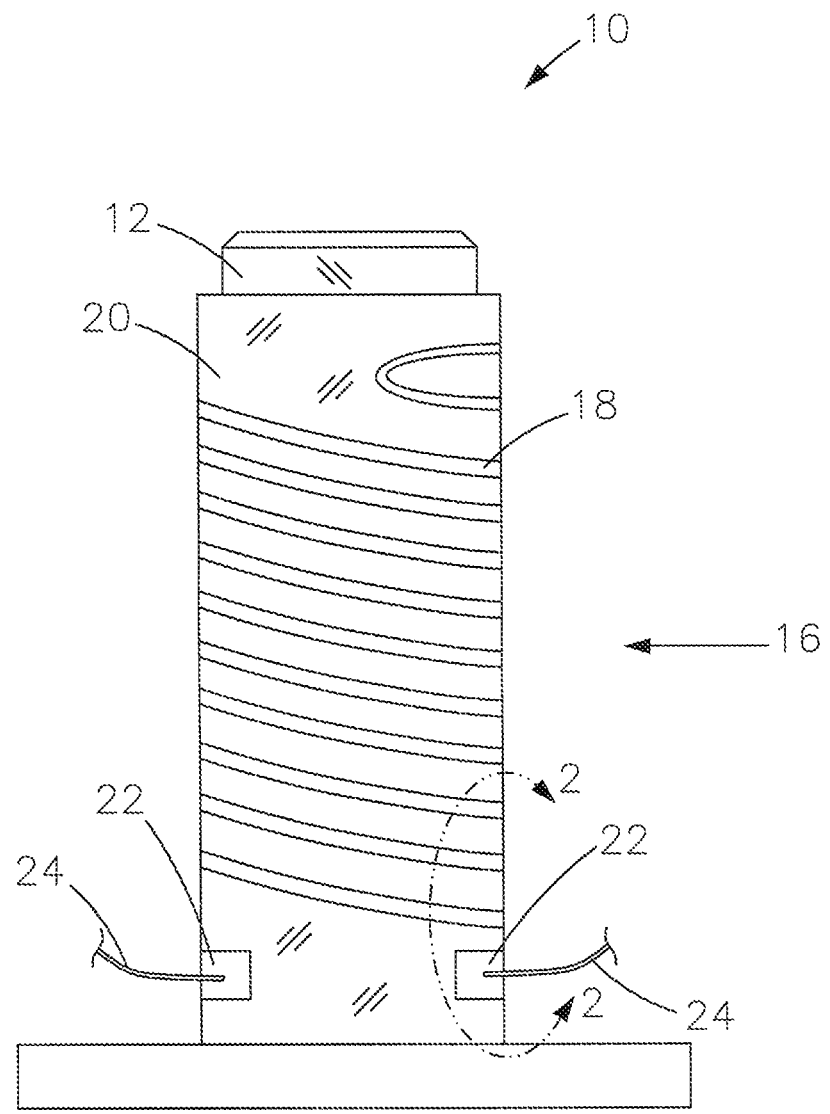
FIG. 1 is a side view of a layered resistive device disposed around a target and constructed in accordance with the principles of the present disclosure.

Referring to FIG. 1, a layered resistive device in accordance with the principles of the present disclosure is illustrated and generally indicated by reference numeral 10. The layered resistive device 10 is disposed around a target 12, to which a resistive load or heat is to be provided by the layered resistive device 10. The layered resistive device 10 is illustrated as being tubular and co-axially disposed, by way of example, around the target 12. The layered resistive device 10 comprises a substrate 20 upon which a number of functional layers are disposed. One of the functional layers is the resistive layer 18. The resistive layer 18 is shown wrapped around the substrate 20 in a spiral pattern; however, it should be understood that the resistive layer 18 could form any suitable pattern or be a continuous layer while remaining with the scope of the present disclosure. For example, the resistive layer 18 could form a square pattern, a saw tooth pattern, a sinusoidal pattern, or any other suitable pattern, among others. In the alternative, the resistive layer 18 could be provided having no pattern at all, and instead could be a continuous sheet.

In two exemplary forms, the substrate 20 is formed of aluminum oxide ($Al_2O_3$) or 430 stainless steel; however, any other suitable material may be employed depending on the specific application requirements and the material being used for the various layers. Other suitable materials include, but are not limited to, nickel-plated copper, aluminum, stainless steel, mild steels, tool steels, refractory alloys, and aluminum nitride, among others.

For the layered resistive device 10 of FIG. 1, the resistive layer 18 provides a heater circuit; however, it should be understood that the resistive layer 18 could provide other functions while remaining within the spirit and scope of the present disclosure, in addition to a heater circuit or in the alternative. For example, the resistive layer 18 could serve as both a heater element and a temperature sensor, a form which is disclosed in U.S. Pat. No. 7,196,295, which is commonly assigned with the present application, and the contents of which are incorporated herein by reference in their entirety.

In some applications, the resistive layer 18 functions as a load resistor instead of a heating element. A resistive layer 18 designed as a load resistor preferably has minimal inductance and is formed in a sinusoidal pattern. Such a load resistor may be used to pack other components. For example, it is contemplated that a load resistor device 16 has utility in artillery shells or missile applications. Load resistors may help protect these devices by acting as a power dump for other components, to isolate the artillery shells or missiles from the power dissipated by such other components.

The resistive layer 18 is preferably connected to a pair of conductors 22, which are terminal pads that are further connected to a power source (not shown) through terminal wires 24. It should be understood that the conductors 22 could take forms other than terminal pads, without departing from the spirit and scope of the present disclosure, so long as the resistive layer 18 is electrically connected to a power source in another suitable manner. In one form, the conductors 22 could be omitted and the resistive trace of the resistive layer 18 could connect directly to the terminal wires 24. The terminal wires 24 could be any suitable electrical lead.

Figure 2:
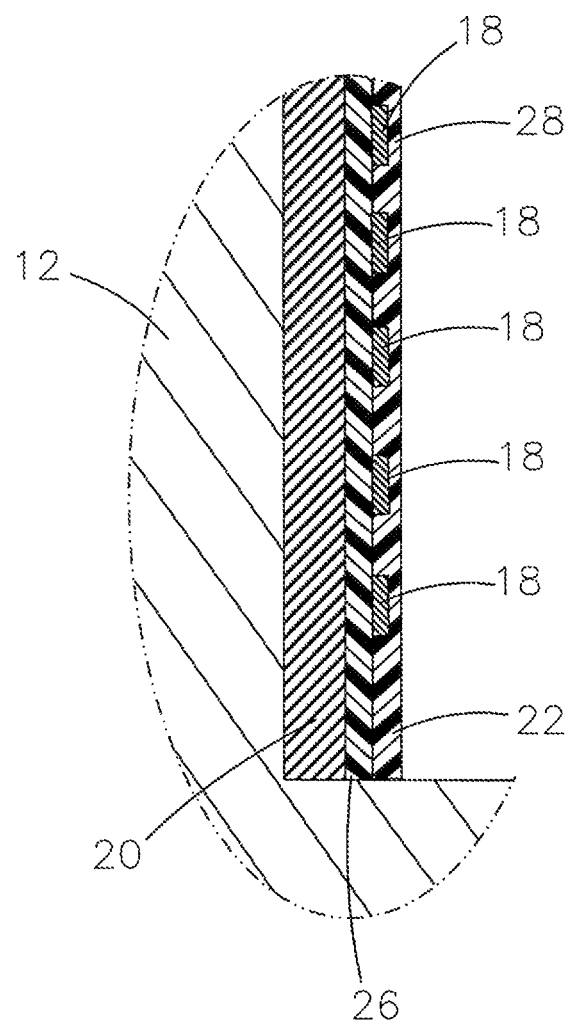
FIG. 2 is a partial cross-sectional view of a portion of the layered resistive device of FIG. 1, showing details of various layers on a substrate of the layered resistive device constructed in accordance with the principles of the present disclosure.

Referring now to FIG. 2, a cross section of the layered resistive device 10 taken along the partial detail 2-2 of FIG. 1 is illustrated. As shown, the layered resistive device 10 comprises the substrate 20 and several layers disposed on the exterior of the substrate 20. It should be understood that although the substrate 20 is shown in FIGS. 1-2, the substrate 20 is not a necessary element of the present disclosure. In some applications, the substrate 20 can be eliminated, and the layers can be applied directly to the target 12.

The layers disposed on the substrate 20 will now be described more particularly. A dielectric layer 26 is disposed on the surface of the substrate 20, which may be an exterior surface as shown, or any other surface of the substrate 20. Advantageously, the dielectric layer 26 is a thick film layer comprised of a single layer of dielectric tape in one form of the present disclosure. Although the dielectric layer 26 is disposed directly on the substrate 20, it should be understood that there could be an additional functional layer disposed between the substrate 20 and dielectric layer 26, while remaining within the spirit and scope of the present disclosure. For example, a bond layer (not shown) could be disposed between the substrate 20 and the dielectric layer 26. The dielectric layer 26 helps provide electrical isolation between the substrate 20 and the resistive layer 18. Therefore, the dielectric layer 26 is disposed on the substrate 20 in a thickness commensurate with the power output of the resistive layer 18. A single layer of dielectric tape having the desired thickness may be applied to the substrate 20; the resistive layer 18 may then be disposed on the single layer of dielectric tape.

Prior to processing, the dielectric tape is a flexible sheet of material that may be handled and manipulated to conform with the geometry of the substrate 20 or target 12. The dielectric tape generally does not exhibit adhesiveness or tackiness, and as such, may be repositioned multiple times as necessary prior to laminating the tape to the substrate 20 or target 12, or other functional layer. As a dielectric tape, the material has dielectric properties, but these properties may not become apparent until after the dielectric layer is in its final form, i.e., after firing. Therefore, as used herein, the term "tape" (whether used for a dielectric layer, a resistive layer, a protective layer, or other functional layer) shall be construed to mean a flexible, sheet-like material that is manipulated to conform to, and to be laminated to, a substrate, a target, or other layer of the resistive device 10.

For a given application, it may be desirable that the dielectric layer 26 have sufficient dielectric strength to provide insulation between the materials disposed on each side of the dielectric layer 26, to prevent arcing therebetween. Likewise, thermal uniformity is often desired. A single layer of dielectric tape has been shown to have a desirable dielectric strength, uniform thickness, and thermal uniformity when used in a layered resistive device 10. Accordingly, the dielectric tape may be provided in the desired thickness according to application requirements. The type of dielectric tape chosen may depend on the substrate 20 material and the electrical output of the resistive layer 18. One preferred tape for a 430 stainless steel substrate, is a lead-free ceramic tape having a thickness of about 50-300 μm. It should be understood that a variety of dielectric tapes (materials and thicknesses) may be provided depending on the specific application, and thus the dielectric tape as described herein should not be construed as limiting the scope of the present disclosure. Additionally, although only a single layer of the dielectric tape is sufficient for many applications, more than one layer of dielectric tape may be employed while remaining within the scope of the present disclosure.

As further shown, the resistive layer 18 is disposed on the dielectric layer 26. Typically, the resistive layer 18 takes on a pattern, and as described above, may also be provided in a continuous layer. The conductors 22 are typically disposed on the dielectric layer 26 and are in electrical communication with the resistive layer 18. In the alternative, the layered resistive device 10 could be provided without conductors 22. The resistive layer 18 may be formed by any suitable process while remaining within the spirit and scope of the present disclosure. For example, the resistive layer 18 may be applied by any layered process such as a thick film process, a thin film process, thermal spray, or sol-gel, among others. As used herein, the term "layered resistive device" should be construed to include devices that comprise at least one functional layer (e.g., dielectric layer 26 only, resistive layer 18 and dielectric layer 26, among others), wherein the layer is formed through application or accumulation of a material to a substrate, target, or another layer using processes associated with thick film, thin film, thermal spraying, or sol-gel, among others. These processes are also referred to as "layered processes" or "layering processes."

Thick film processes may include, by way of example, screen printing, spraying, rolling, and transfer printing, among others. Thin film processes may include, by way of example, ion plating, sputtering, chemical vapor deposition (CVD), and physical vapor deposition (PVD), among others. Thermal spraying processes may include, by way of example, flame spraying, plasma spraying, wire arc spraying, and HVOF (High Velocity Oxygen Fuel), among others.

In one form, the resistive layer 18 may be formed from a single layer of tape, which could be applied by the methods described in further detail below. The resistive layer 18 could be applied as a single layer having no trace or pattern, or it could have a pre-determined trace or pattern that is applied to a substrate 20 in a tape form. Additionally, the single layer of tape may be provided with a variable thickness such that the watt density of the resistive layer 18 can vary along the length of the trace or pattern, or across the continuous layer. It should be understood that such a variable thickness form of tape may also be provided for the other functional layers while remaining within the scope of the present disclosure.

The protective layer 28 is disposed on the resistive layer 18 and may also cover the conductors 22, so long as the conductors 22 may be electrically connected to the lead wires (FIG. 1) and/or a power source (not shown). Preferably, at least a portion of the conductors 22 are exposed through the protective layer 28. The protective layer 28 is preferably an insulator; however, other materials such as an electrically or thermally conductive material may also be employed according to the requirements of a specific application, while remaining within the spirit and scope of the present disclosure. In one form, the protective layer 28 is a dielectric material for electrical isolation and protection of the resistive layer 18 from the operating environment. As such, protective layer 28 may comprise a single layer of dielectric tape, similar to the dielectric layer 26 as previously set forth. In the alternative, the protective layer 28 could be applied using other thick film processes, including but not limited to screen printing, spraying, rolling, and transfer printing. Furthermore, the protective layer 28 could be applied by other layered processes such as sol-gel or thermal spray processes, among others, while remaining within the spirit and scope of the present disclosure. Generally, sol-gel layers are formed using processes such as dipping, spinning, or painting, among others.

In an alternate form, only the protective layer 28 is provided as a thick film dielectric tape, while the other layers are provided using one or more layered processes. For example, the dielectric layer 26 may be provided by a thick film, thin film, thermal spray, or sol-gel process. The resistive layer 18 would also be provided by a conventional method such as thick film, thin film, or thermal spray. In some applications, the resistive layer 18 is applied directly to the substrate 20, and the protective layer 28 is provided as a thick film dielectric tape and is disposed over the resistive layer 18.

Figure 3:
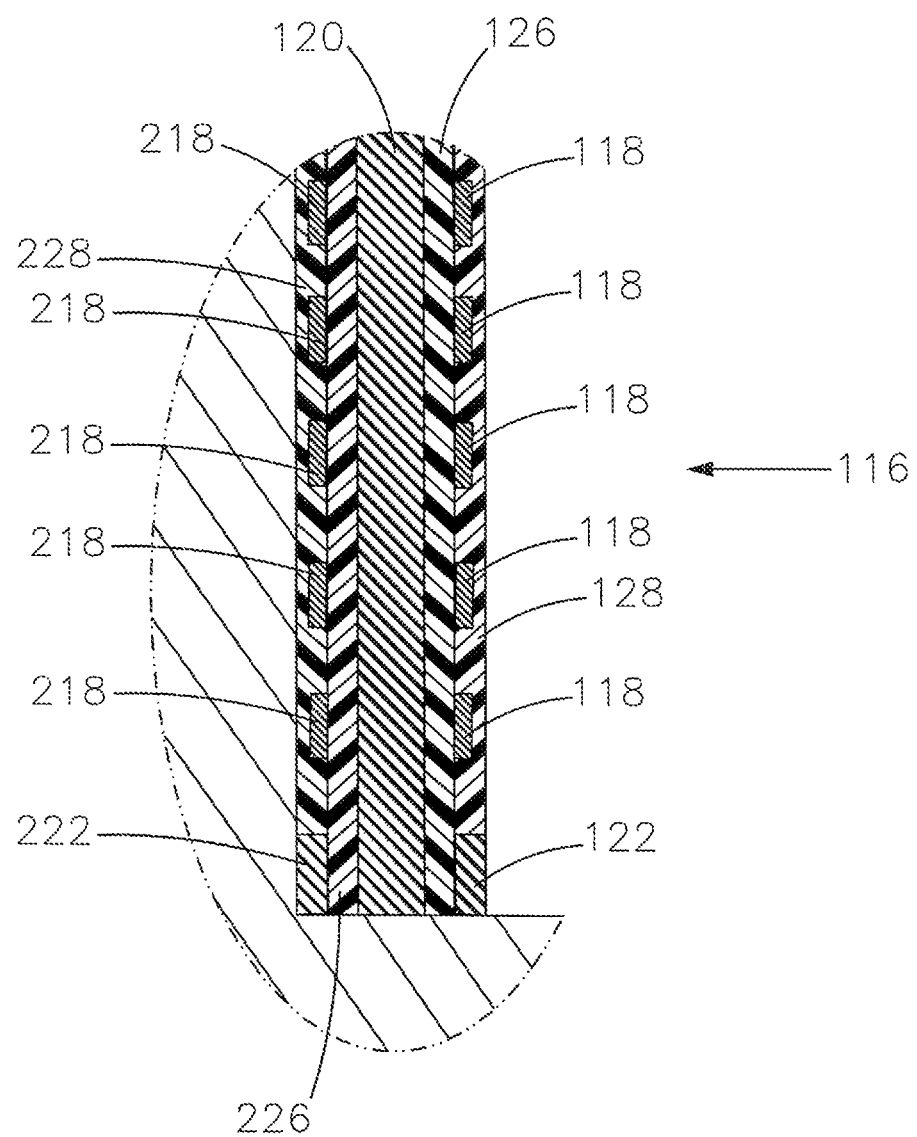
FIG. 3 is a partial cross-sectional view of a portion of another layered resistive device having layers on both the exterior surface and the interior surface of the substrate and constructed in accordance with the principles of the present disclosure.

With reference to FIG. 3, a cross section of another layered resistive device 116 is illustrated. Like the layered resistive device 16 of FIG. 2, the layered resistive device 116 includes a substrate 120, which has layers disposed on its exterior surface, including a dielectric layer 126, a resistive layer 118, and a protective layer 128. In addition to having layers on its exterior surface, the substrate 120 also has similar layers on its interior surface, including a dielectric layer 226, a resistive layer 218, and a protective layer 228. Conductors 122, 222 connect the resistive layers 118, 218 to a power source (not shown). It should be understood that the conductors 122, 222 could be omitted, if desired. Further, it should be understood that the base dielectric layers 126, 226 could be omitted in some applications, and the resistive layers 118, 218 and/or protective layers 128, 228 could be provided in a tape form.

Figure 4:
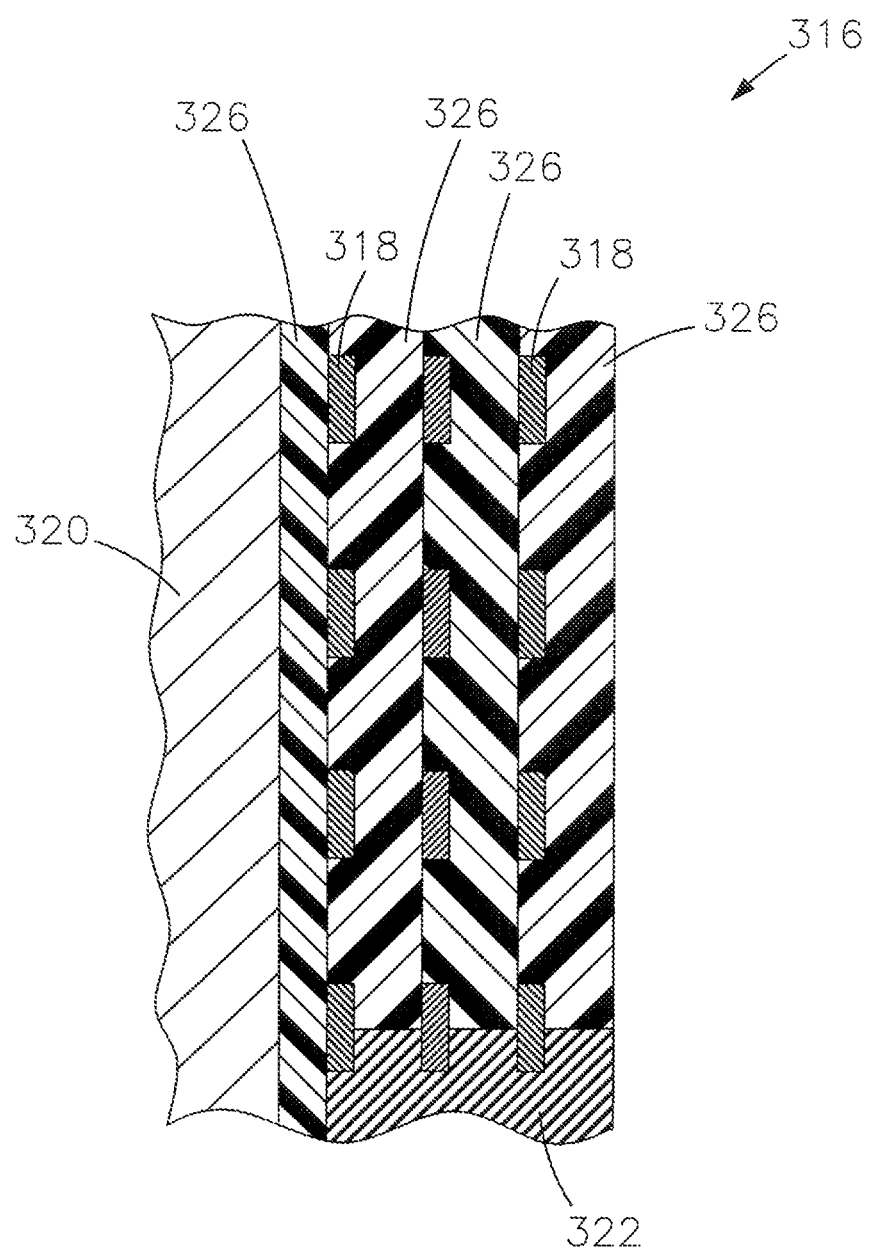
FIG. 4 is a partial cross-sectional view of a portion of yet another layered resistive device having multiple resistive element layers and multiple dielectric layers on a surface of the device constructed in accordance with the principles of the present disclosure.

With reference to FIG. 4, a cross section of yet another layered resistive device 316 is illustrated. The layered resistive device 316 includes a substrate 320, and disposed on the substrate 320 is a dielectric layer 326 comprising a single layer of dielectric tape. A resistive layer 318 is disposed on the dielectric layer 326. The layered resistive device 316 further includes additional functional layers, wherein a plurality of resistive layers 318 are formed on a plurality of corresponding dielectric layers 326. Each resistive layer 318 is connected to a conductor 322, which may be one conductor 322 or a plurality of conductors 322; however, it should be understood that the conductors 322 could be omitted, if desired. The plurality of resistive layers 318 may be used for additional output in the form of wattage, and/or they may be used for redundancy in the event that one resistive layer 318 fails. The plurality of resistive layers 318 may also be employed to satisfy resistive requirements for applications where low or high resistance is required in a small effective area, or over a limited footprint. Additionally, or in the alternative, multiple circuits, or resistive layer 318 patterns may be employed within the same resistive layer 318. Although the layers 326, 318 are shown on one surface of the substrate 320, it should be understood that the layers 326, 318 could be provided on another surface of the substrate as well.

Figure 5:
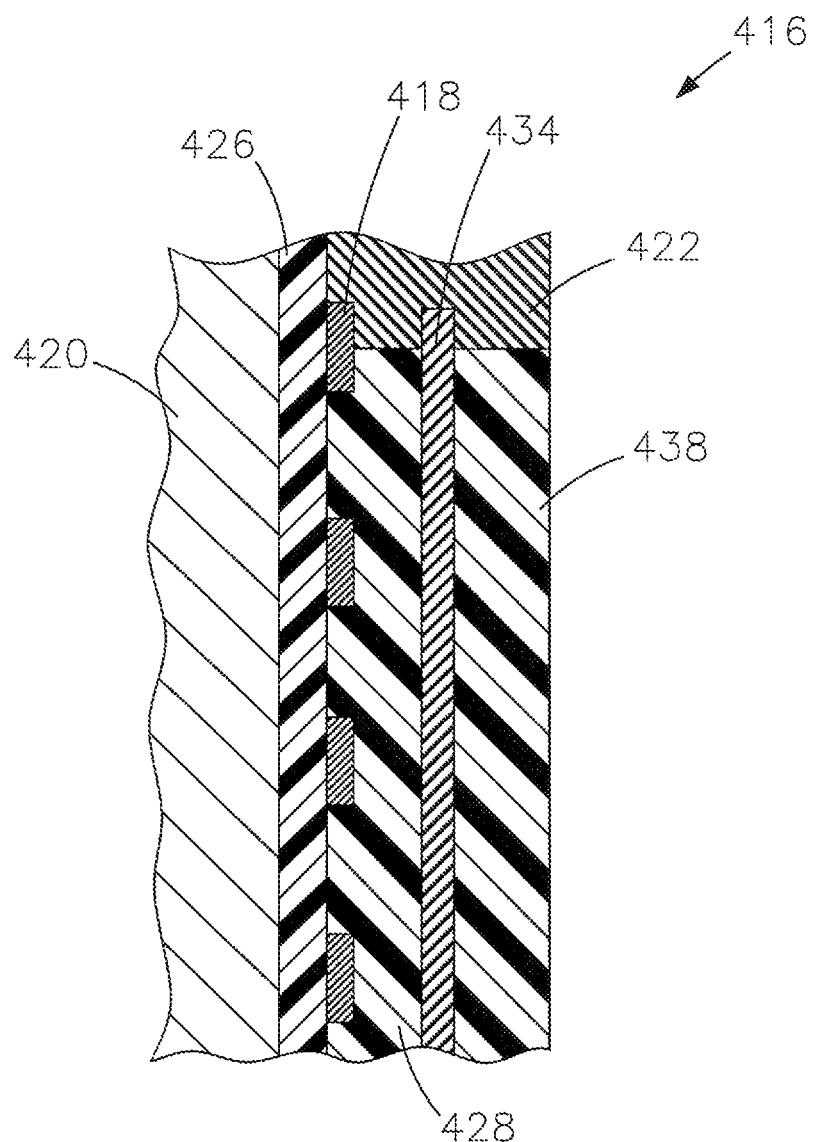
FIG. 5 is a partial cross-sectional view of a portion of still another layered resistive device having a functional layer disposed between a resistive element layer and a protective layer constructed in accordance with the principles of the present disclosure.

With reference to FIG. 5, a cross section of still another layered resistive device 416 having layers on its exterior surface is illustrated. The layered resistive device 416 has a substrate 420 upon which a dielectric layer 426 is disposed, the dielectric layer 426 comprising dielectric tape. A resistive layer 418 is disposed on the dielectric layer 426, and a protective layer 428 is disposed on the resistive layer 418. The protective layer 428 could alternatively, or additionally, be a dielectric layer 426. An additional functional layer 434 is disposed on the protective layer 428. In the alternative, the additional functional layer 434 could be employed instead of the protective layer 428, thereby eliminating the protective layer 428. The additional functional layer 434 could have a number of configurations and/or functions while remaining within the spirit and scope of the present disclosure. For example, the additional functional layer 434 could be a sensor layer, such as a Resistance Temperature Detector (RTD) temperature sensor, a ground shield, an electrostatic shield, or a radio frequency (RF) shield, among others. The additional functional layer 434 could optionally have an outer protective layer 438 disposed thereon.

As in the previous forms, the layers 426, 418, 428, 434, 438 could be provided on more than one surface of the substrate 420, if desired. Furthermore, conductors 422 could be optionally provided to connect the resistive layer 418 to a power source (not shown). It should also be understood that, in some applications, the dielectric layer 426 or the protective layers 428, 434 could omitted, and one of the remaining layers 426, 418, 428, 434, 438 could be provided in a tape form.

Figure 6A:
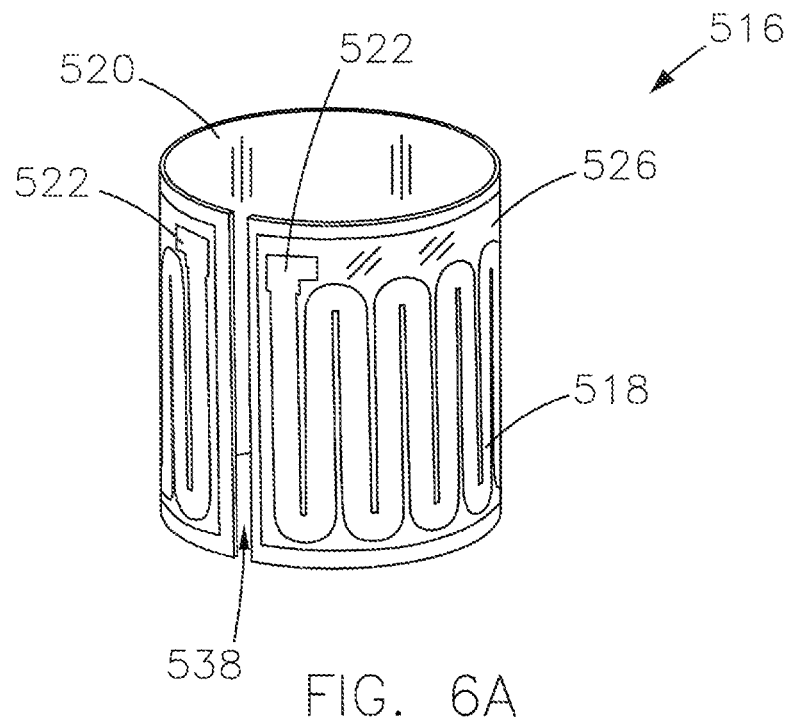
FIG. 6A is a perspective view of a layered resistive device having a split-sleeve configuration and constructed in accordance with the principles of the present disclosure.

With reference to FIG. 6A, a layered resistive device 516 is illustrated. The layered resistive device 516 includes a substrate 520, which has a dielectric layer 526 comprising dielectric tape disposed thereon and a resistive layer 518 disposed on the dielectric layer 526. Although the substrate 520 is shown having a tubular shape, it should be understood that the shape of the substrate 520 is merely exemplary, and the substrate 520 could have any number of various shapes and/or sizes. Conductors 522 provide electrical communication between the resistive layer 518 and a power source (not shown); however, it should be understood that the conductive layers 522 could be omitted, if desired. In most applications, a protective layer would cover the resistive layer 518. The substrate 520 has a split sleeve configuration, wherein a slot 538 is provided in the substrate 520 and extends along the length of the substrate 520. The slot 538 allows the resistive device 516 to be slightly deformed so that it may be easily inserted into or placed around a target for an improved fit.

Figure 6B:
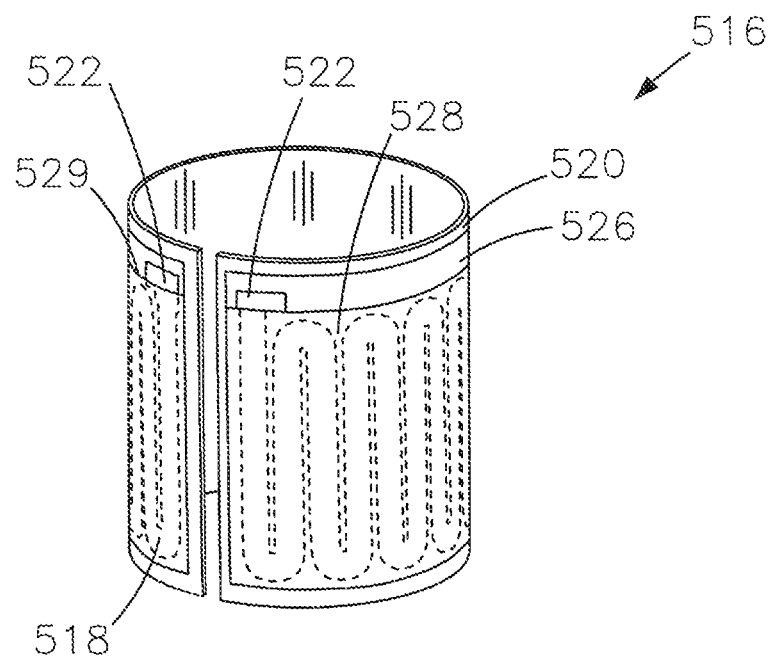
FIG. 6B is a perspective view of a layered resistive device having a split-sleeve configuration and further comprising a protective layer constructed in accordance with the principles of the present disclosure.

With reference to FIG. 6B, the layered resistive device 516 is shown having a protective layer 528 disposed over the resistive layer 518. As shown herein, the protective layer 528 comprises a single layer of dielectric tape, similar to the dielectric layer 526. In the alternative, the protective layer 528 could be formed of multiple layers or by another layered process, such as screen printing, spraying, rolling, transfer printing, sol-gel, or thermal spray, among others.

The protective layer 528 covers the resistive layer 518 but does not cover the conductors 522; the conductors 522 are exposed so that they may conduct an electric current to the resistive layer 518 from the lead wires. In an alternate form, the conductors 522 could be omitted and the resistive layer 518 itself could protrude from the protective layer 528 for further connection within a circuit. The conductors 522 or the resistive layer 518 could be exposed near the side 529 of the protective layer 528, as shown, or they could be exposed through apertures (not shown) within the protective layer 528, without falling beyond the spirit and scope and of the present invention.

Although the layers 526, 518 are shown disposed on an outer surface of the substrate 520, it should be understood that the layers 526, 518 could also be provided on the inner surface of the substrate 520. Further, it should also be understood that, in some applications, the dielectric layer 526 could be omitted, and the resistive layer 518 and the protective layer 528 could be applied onto the substrate 520.

Figure 7A:
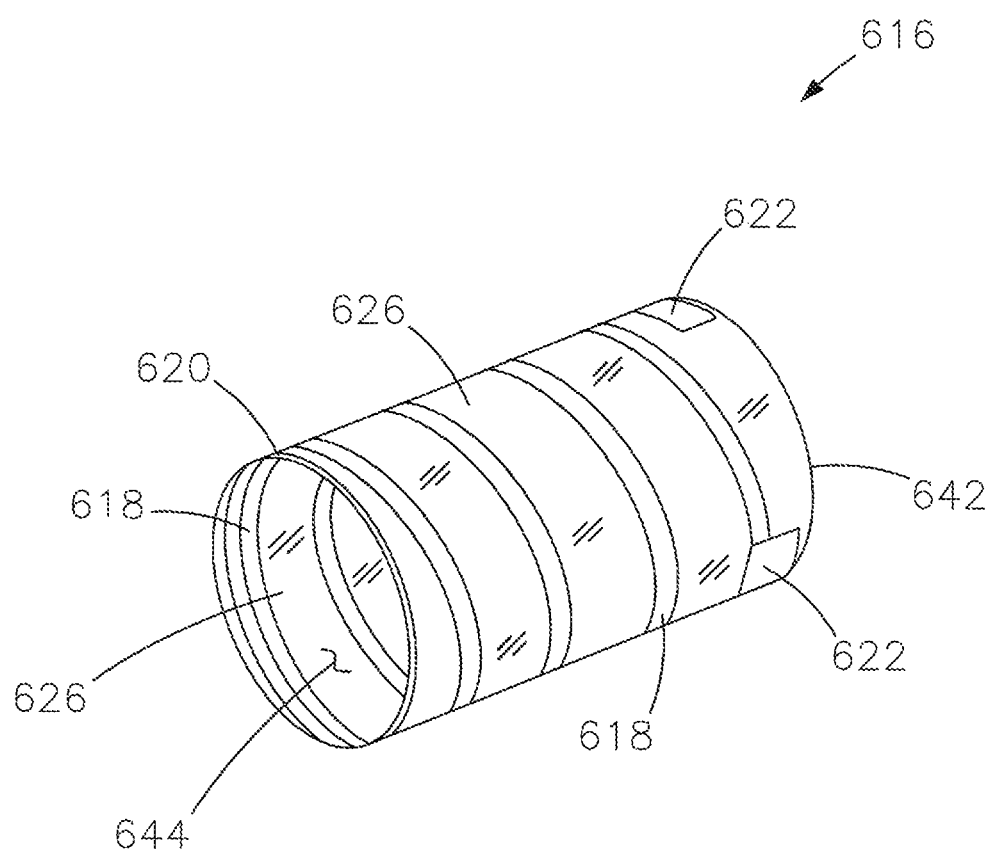
FIG. 7A is a perspective view of a layered resistive device having a cylindrical configuration and a resistive layer having a spiral pattern constructed in accordance with the principles of the present disclosure.

With reference to FIG. 7A, another layered resistive device 616 is illustrated. The layered resistive device 616 has a cylindrical configuration and includes a substrate 620, a dielectric layer 626 comprising dielectric tape disposed on the substrate 620, and a resistive layer 618 disposed on the dielectric layer 626. Dielectric layers 626 and resistive layers 618 may be disposed on both the inner surface 617 and the outer surface 619 of the substrate 620, as shown in FIG. 7A, or they may be disposed on just one of the surfaces 617, 619. Conductors 622 provide electrical communication between the resistive layer 618 and a power source (not shown); however, it should be understood that the conductors 622 could be omitted, if desired. In most applications, a protective layer would cover the resistive layers 618. The resistive layer 618 has a spiral pattern; however, it should be understood that the resistive layer 618 could have any desirable pattern while remaining within the spirit and scope of the present disclosure. Like with the previous forms, it should be understood that the dielectric layer 626 could be omitted, and the resistive layer 618 and/or a protective layer (not shown) could be provided in a tape form.

A distal end 642 of the resistive device 616 may be open, like a proximal end 644, or it may be closed, depending on the particular application for which the resistive device 616 is intended. For example, in a closed configuration, the resistive device 616 could include a cap (not shown) attached to the distal end 642 and/or the proximal end 644.

Figure 7B:
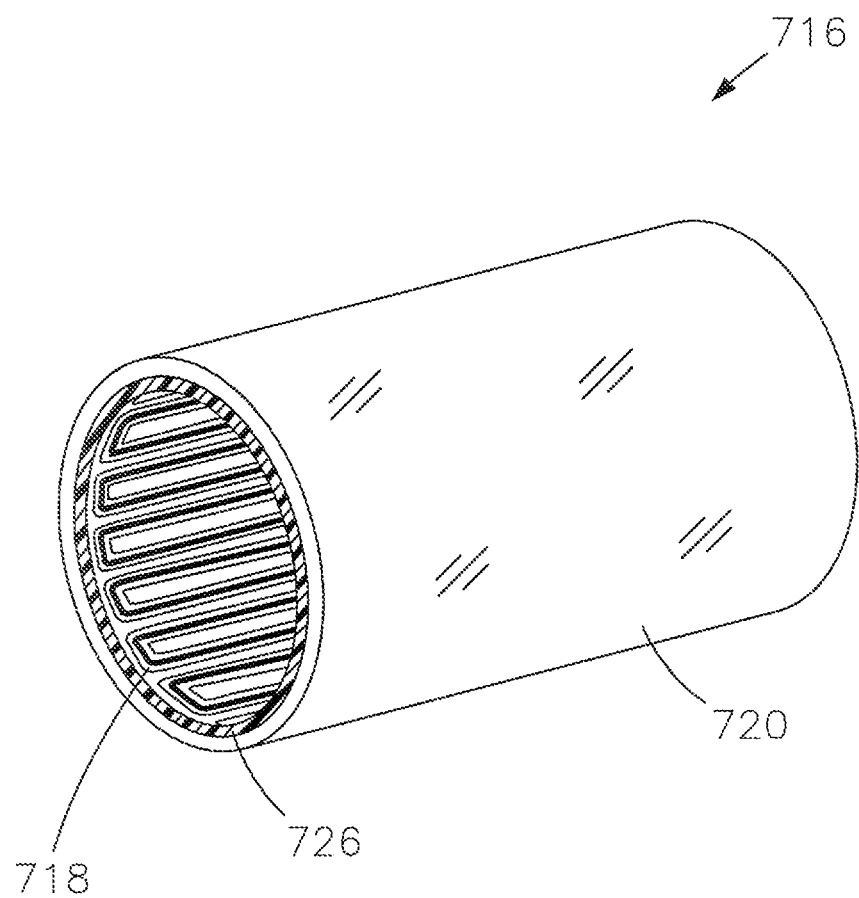
FIG. 7B is a perspective view of another layered resistive device having a cylindrical configuration and a resistive layer disposed on its interior surface, the resisting layer having a relatively square pattern and constructed in accordance with the principles of the present disclosure.

With reference to FIG. 7B, another layered resistive device 716 is illustrated. The layered resistive device 716 includes a substrate 720, which has a dielectric layer 726 comprising dielectric tape disposed on its interior surface. A resistive layer 718 having a relatively square pattern is disposed on the dielectric layer 726. The resistive layer 718 need not be limited to a relatively square pattern as illustrated herein, but may form of any suitable pattern while remaining within the spirit and scope of the present disclosure.

Like the previous forms, the layers 718, 726 could be provided on more than one surface of the substrate 720 if desired. Furthermore, conductors (not shown) could optionally be used to connect the resistive layer 718 to a power source (not shown). It should also be understood that, in some applications, the dielectric layer 726 could be omitted, and the resistive layer 718 and/or a protective layer (not shown) could be provided in a tape form.

Figure 8:
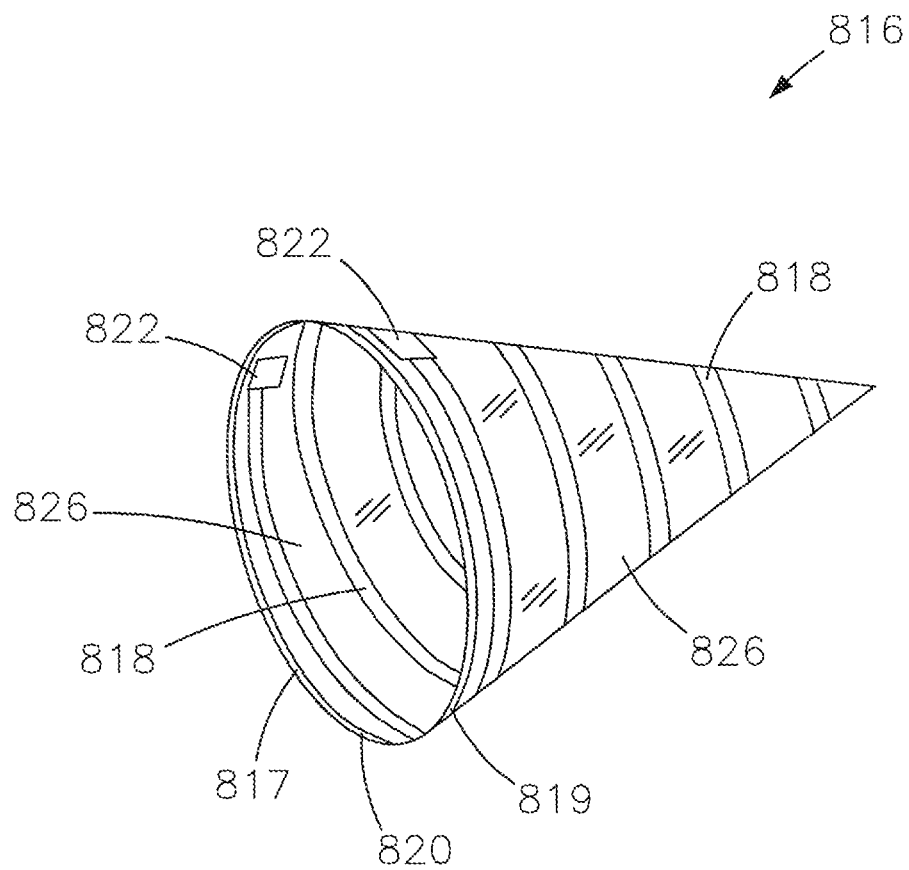
FIG. 8 is a perspective view of a layered resistive device having a conical configuration constructed in accordance with the principles of the present disclosure.

With reference to FIG. 8, another layered resistive device 816 is illustrated. In this form, the layered resistive device 816 defines a conical configuration. The layered resistive device 816 includes a substrate 820, a dielectric layer 826 comprising dielectric tape disposed on the substrate 820, and a resistive layer 818 disposed on the dielectric layer 826. Dielectric layers 826 and resistive layers 818 may be disposed on both the inner surface 817 and the outer surface 819 of the substrate 820, as shown in FIG. 7A, or they may be disposed on just one of the surfaces 817, 819. Conductors 822 provide electrical communication between the resistive layer 818 and a power source (not shown); however, it should be understood that the conductors 822 could be omitted, if desired. In most applications, a protective layer would cover the resistive layer 818. The resistive layer 818 has a spiral pattern; however, it should be understood that the resistive layer 818 could have any desirable pattern while remaining within the spirit and scope of the present disclosure. In some applications, the dielectric layers 826 could be omitted, and the resistive layer 818 and/or a protective layer (not shown) could be provided in a tape form.

Figure 9A:
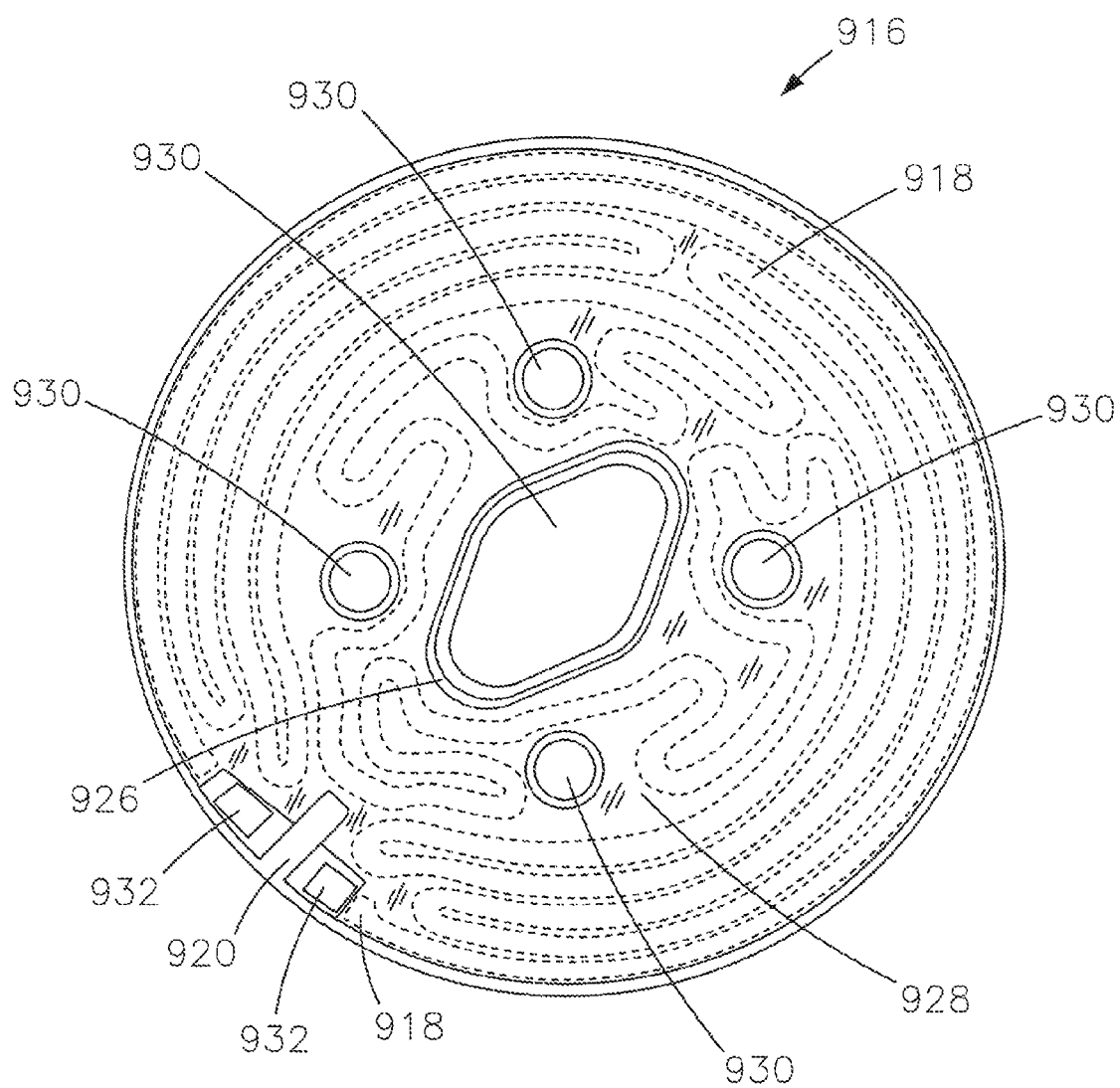
FIG. 9A is a plan view of a layered resistive device having a flat, circular configuration constructed in accordance with the principles of the present disclosure.

With reference to FIG. 9A, still another layered resistive device 916 is illustrated. The layered device resistive 916 includes a substrate 920 having a flat, circular configuration. The substrate 920 has a dielectric layer 926 disposed thereon, which comprises a dielectric tape. A resistive layer 918 is disposed on the dielectric layer 926, and a protective dielectric layer 928 is disposed on the resistive layer 918, which may be a dielectric tape as with the dielectric layer 926. It should be understood that the resistive layer 918 could have any number of patterns while remaining within the spirit and scope of the present disclosure, or it could have no pattern at all and be a continuous layer. Further, the dielectric layer 926 could be omitted, and the resistive layer 918 and/or the protective layer 928 could be provided in a tape form.

The substrate 920 has cut-outs 930 and notches or slots 932. Such cut-outs 930 and notches or slots 932 may be provided to help fit the substrate 920 to a surrounding environment, to mount or locate the substrate 920 or layers 926, 918, 928, or to mount devices, such as sensors, to the substrate 920, among other uses. It should be understood that any of the forms illustrated in FIGS. 1-11 could also have cut-outs, notches, or slots. The cut-outs 920 or slots 932 could be plugged during manufacturing processes, if desired.

Figure 9B:
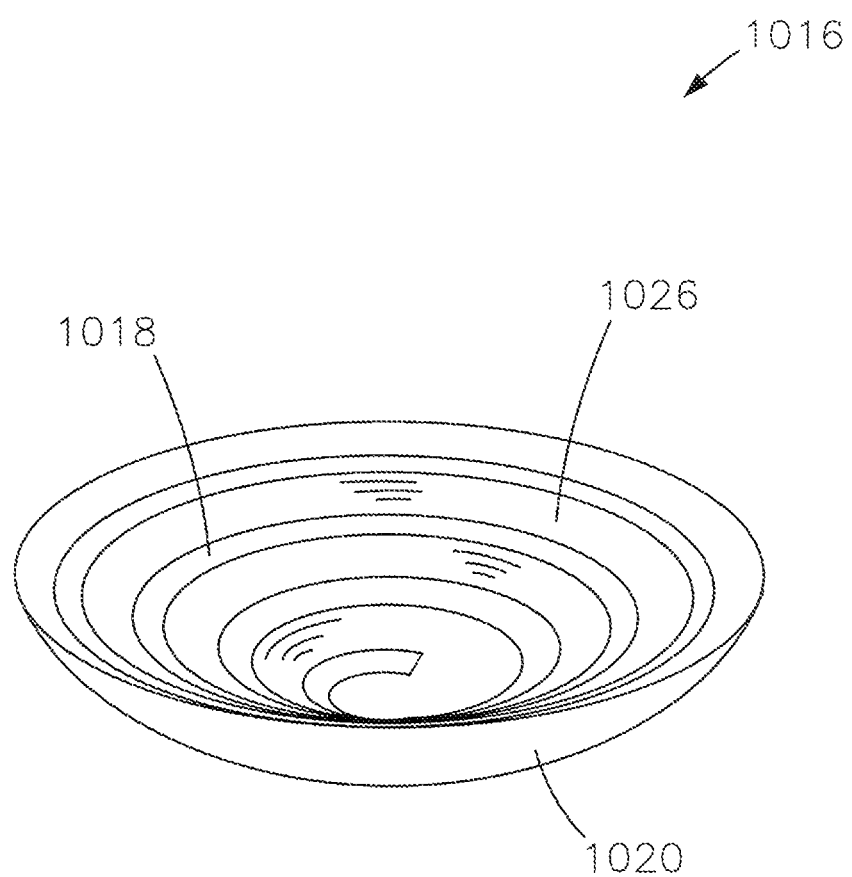
FIG. 9B is a perspective view of a layered resistive device having a circular concave configuration constructed in accordance with the principles of the present disclosure.

With reference to FIG. 9B, still another layered resistive device 1016 is illustrated. The layered resistive device 1016 includes a substrate 1020 having a circular, concave shape. A dielectric layer 1026, comprising dielectric tape, is disposed on the inner, concave surface of the substrate 1020. It should be understood that the dielectric layer 1026 could also or alternatively be disposed on the outer surface of the substrate 1020. A resistive layer 1018 having a spiral pattern is disposed on the dielectric layer 1026. It should be understood that although the resistive layer 1018 is shown having a spiral pattern, the resistive layer 1018 could have any suitable pattern while remaining within the spirit and scope of the present disclosure. In many applications, a protective layer would be disposed on the resistive layer 1018 and may comprise a dielectric tape. Further, conductors (not shown) could optionally be provided to electrically connect the resistive layer 1018. In some applications, the dielectric layer 1026 could be omitted, and the resistive layer 1018 and/or a protective layer could be provided in a tape form.

Figure 9C:
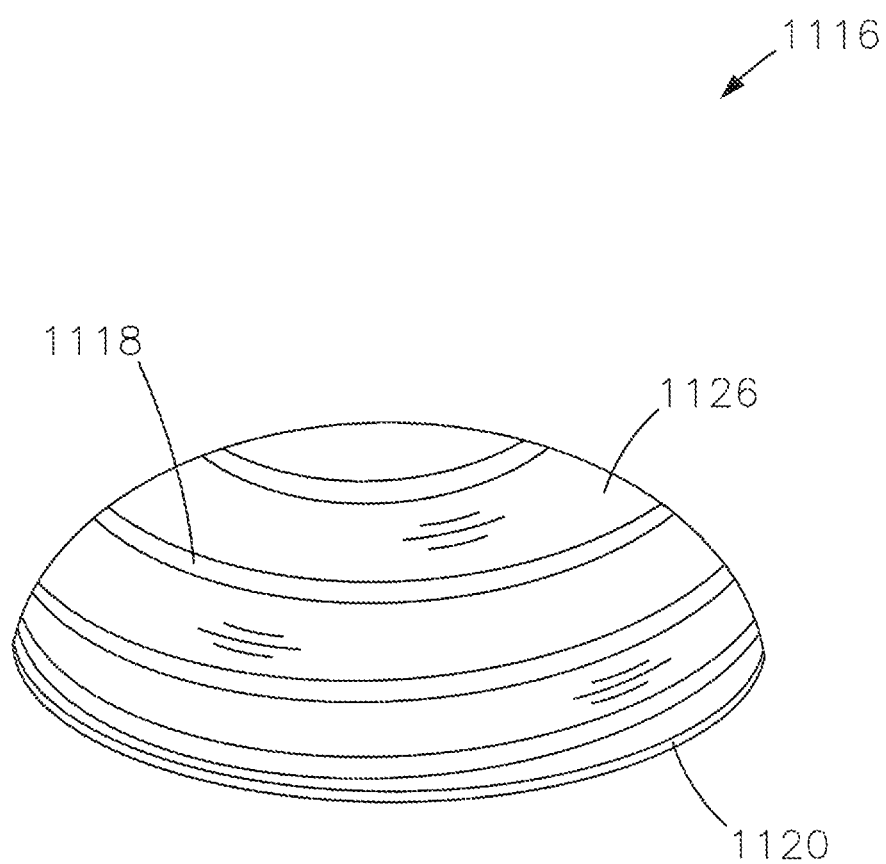
FIG. 9C is a perspective view of a layered resistive device having a circular convex configuration constructed in accordance with the principles of the present disclosure.

With reference to FIG. 9C, still another layered resistive device 1116 is illustrated. The layered resistive device 1116 has a substrate 1120 having a circular, convex shape. A dielectric layer 1126, comprising dielectric tape, is disposed on the outer, convex surface of the substrate 1120. It should be understood that the dielectric layer 1126 could also or alternatively be disposed on the inner surface of the substrate 1120. A resistive layer 1118 having a spiral pattern is disposed on the dielectric layer 1126. It should be understood that although the resistive layer 1118 is shown having a spiral pattern, the resistive layer 1118 could have any suitable pattern while remaining within the spirit and scope of the present disclosure. In many applications, a protective layer would be disposed on the resistive layer 1118, which may comprise a dielectric tape. Further, like the previous forms, conductors (not shown) could optionally be provided to electrically connect the resistive layer 1118. In some applications, the dielectric layer 1126 could be omitted, and the resistive layer 1118 and/or a protective layer could be provided in a tape form.

Figure 10:
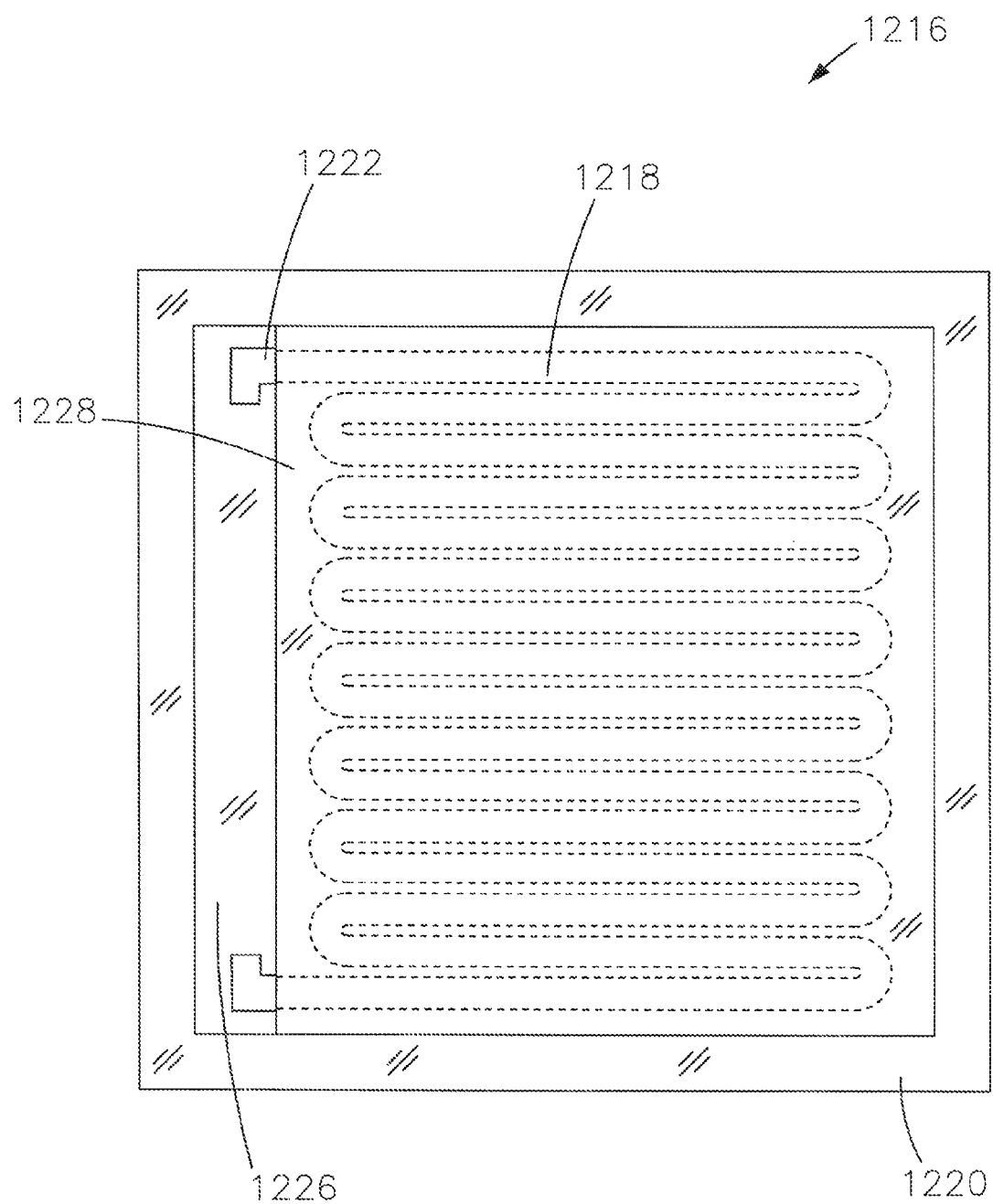
FIG. 10 is a plan view of a layered resistive device having a flat, rectangular configuration constructed in accordance with the principles of the present disclosure.

With reference to FIG. 10 still another layered resistive device 1216 is illustrated. The layered resistive device 1216 has a substrate 1220 having a flat, rectangular configuration. It should be understood that the substrate 1220 could have alternatively have any other shape, without falling beyond the spirit and scope of the present invention. The substrate 1220 has a dielectric layer 1226 disposed thereon, which comprises a dielectric tape. A resistive layer 1218 is disposed on the dielectric layer 1226, and a protective layer 1228 is disposed on the resistive layer 1218, which may also comprise a dielectric tape. It should be understood that the resistive layer 1218 could form any pattern while remaining within the spirit and scope of the present disclosure. The resistive layer 1218 is connected to conductors 1222, which are configured to electrically connect the resistive layer 1218 to a power source; however, it should be understood that the conductors 1222 could be omitted, if desired. In some applications, the dielectric layer 1226 could be omitted, and the resistive layer 1218 and/or the protective layer 1228 could be provided in a tape form.

Figure 11:
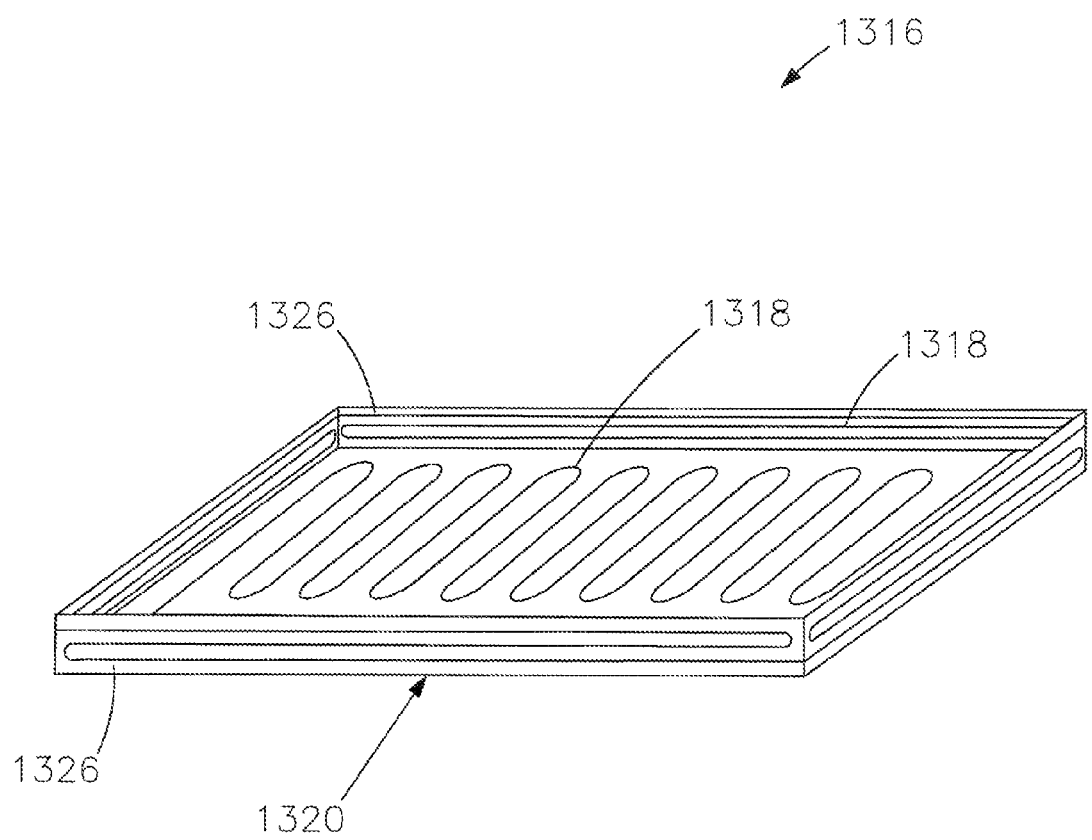
FIG. 11 is a perspective view of a layered resistive device having a open box or buffet tray configuration constructed in accordance with the principles of the present disclosure.

With reference to FIG. 11, still another layered resistive device 1316 is illustrated. The layered resistive device 1316 has a substrate 1320 having an open box, or buffet tray, shape. A dielectric layer 1326, comprising dielectric tape, is disposed on the substrate 1320. A resistive layer 1318 is disposed on the dielectric layer 1326. It should be understood that the resistive layer 1318 could form any suitable pattern while remaining within the spirit and scope of the present disclosure. In many applications, a protective layer would be disposed on the resistive layer 1318, which may also comprise a dielectric tape. The resistive layer 1318 may optionally be connected to conductors (not shown) for further electrical connection.

The layers 1326, 1318 could be provided on multiple surfaces of the substrate 1320, if desired, including being provided on the inside and outside of the open-box-shaped substrate 1320. As with the previous forms, it should be understood that the dielectric layer 1326 could be omitted, and the resistive layer 1318 and/or a protective layer could be provided in a tape form.

Figure 12:
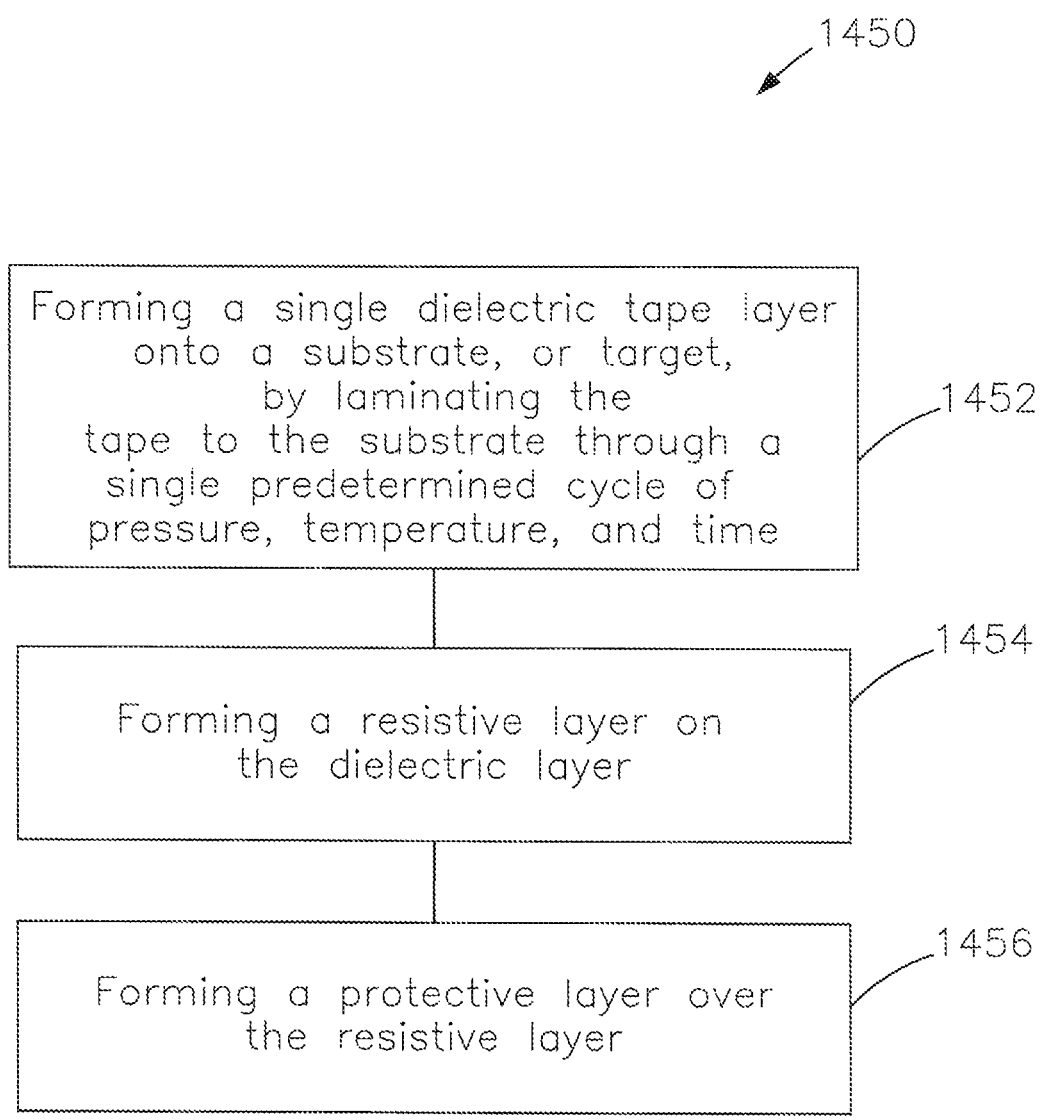
FIG. 12 is a block diagram illustrating a process of forming a layered resistive device in accordance with the teachings of the present disclosure.

Now referring to FIG. 12, a process 1450 of forming a layered resistive device is illustrated. The process 1450 includes a first step 1452 of forming a dielectric layer onto a substrate or target, the dielectric layer defining a single layer of dielectric tape, the dielectric tape being laminated to the substrate through a single predetermined cycle of pressure, temperature, and time. The method 1450 further includes a second step 1454 of forming a resistive layer on the dielectric layer. The method 1450 further includes a third step 1456 of forming a protective layer over the resistive layer.

For use with the process 1450, the substrate may be provided in any suitable shape, such as a tubular shape, a slotted sleeve-like shape, a circular shape, a concave shape, a convex shape, a flat shape, a rectangular shape, or a polygonal shape as previously set forth, among others. Furthermore, the dielectric layer can be laminated onto any suitable target; a substrate need not be used.

Dielectric tape for use with the process of the present disclosure may be provided in the desired thickness, as described above. The tape should be pre-cut to the desired size before laminating the dielectric tape to the substrate or target. The dielectric tape may be located onto the substrate or target using a locating tool, or by locating it manually. Any other suitable way of locating the dielectric tape may also or alternatively be used while remaining within the spirit and scope of the present disclosure.

The dielectric tape may be laminated to the substrate or target in a variety of ways while remaining within the spirit and scope of the present disclosure. The preferred processes of laminating the dielectric tape will hereinafter be described.

With reference to FIGS. 13A-13D, a process of laminating a pre-cut piece of dielectric tape to a cylindrical substrate is illustrated. Although the substrate is shown as cylindrical, the substrate could have other configurations as previously set forth, by way of example, while remaining within the spirit and scope of the present disclosure.

Figure 13A:
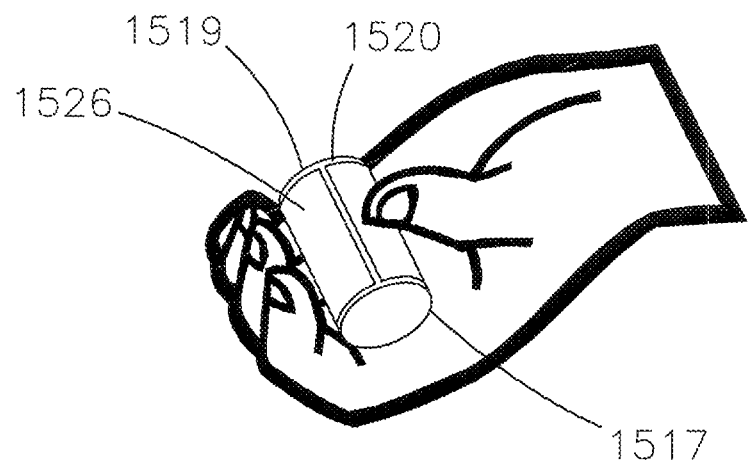
FIG. 13A is a perspective view of a tubular substrate having a piece of pre-cut dielectric tape being held therearound in accordance with a process of the present disclosure.

With reference to FIG. 13A, a single layer of dielectric tape 1526 is manually located around a substrate 1520. In other words, an operator holds the dielectric tape 1526 around the substrate 1520. It is also contemplated that any other suitable methods may be used to locate the dielectric tape 1526 around the substrate 1520, such as automated equipment/tools or robotic methods by way of example, without falling beyond the spirit and scope of the present disclosure. In addition, caps (not shown) could optionally be placed into each end 1517, 1519 of the substrate 1520 to help facilitate a uniform application of pressure during the process cycle, as described in further detail below.

Figure 13B:
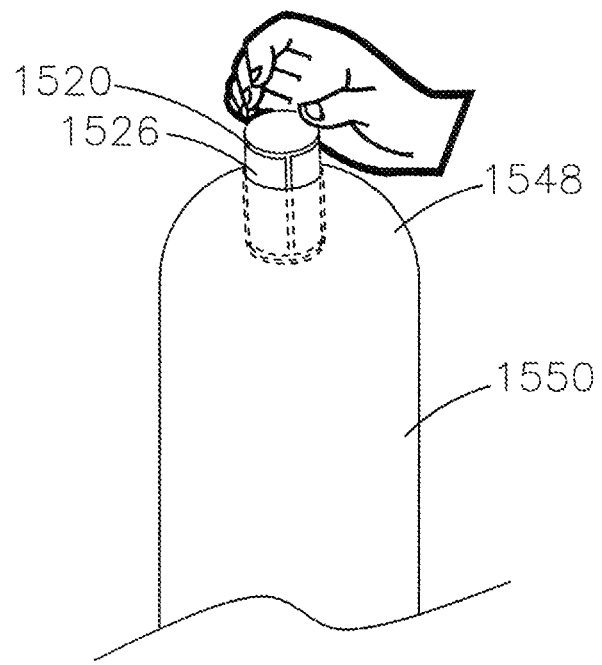
FIG. 13B is a perspective snap-shot view of the tubular substrate and dielectric tape of FIG. 13A being inserted into a distal end of an inflated membrane in accordance with the process of the present disclosure.
Figure 13C:
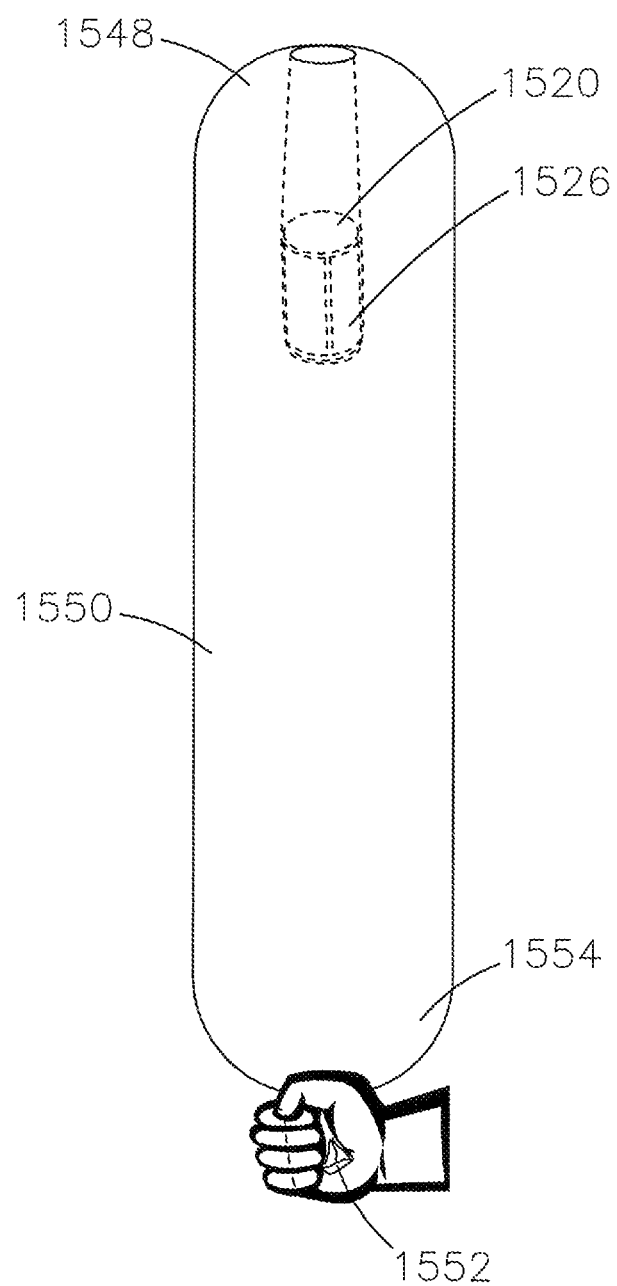
FIG. 13C is a perspective snap-shot view of the tubular substrate and dielectric tape of FIGS. 13A-13B descending into the inflated membrane in accordance with the process of the present disclosure.

With reference to FIG. 13B, the substrate 1520 with the dielectric tape 1526 held therearound is placed onto a distal outer surface 1548 of an inflated membrane 1550. With reference to FIG. 13C, the substrate 1520 and dielectric tape 1526 are inserted into the membrane 1550 as the membrane is deflated from an opening 1552 at a proximal end 1554 of the membrane 1550, thereby pushing the distal outer surface 1548 of the membrane 1550 into the membrane 1550. In other words, the membrane 1550 is deflated while the substrate 1520 and dielectric tape 1526 are simultaneously inserted into the membrane 1550. When the substrate 1520 and dielectric tape 1526 are completely surrounded by the membrane 1550, the membrane 1550 may be completely deflated.

Figure 13D:
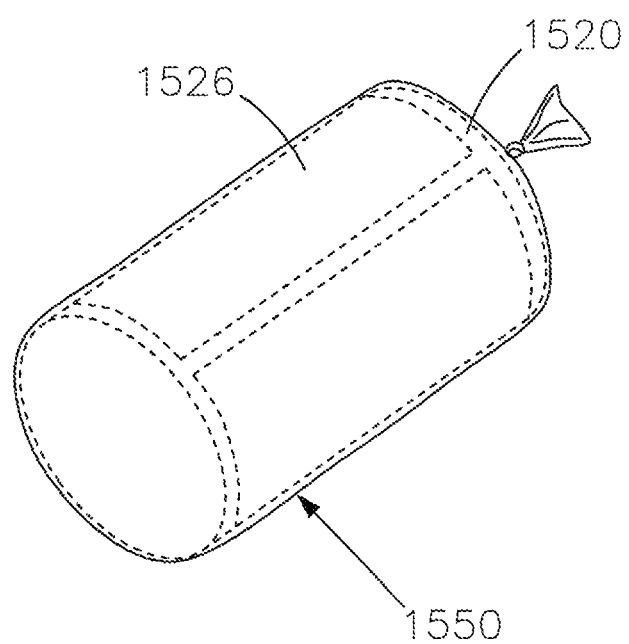
FIG. 13D is a perspective snap-shot view of the inflated membrane of FIGS. 13B-13C being reversed around the tubular substrate and dielectric tape in accordance with the process of the present disclosure.

With reference to FIG. 13D, the membrane 1550 is reversed around the substrate 1520. In other words, after the membrane 1550 is deflated, but before it is reversed, two layers of the membrane 1550 surround the sides of the substrate 1520; the outer layer is then reversed around the substrate 1520 so that only one layer of the membrane 1550 surrounds the sides of the substrate 1520. A portion of membrane 1550 may be cut off at the proximal end 1554 to help reverse the membrane 1550 around the substrate 1520. Thereafter, the membrane 1550 is preferably sealed around the substrate 1520. The membrane 1550 could be sealed in any suitable fashion. By way of example, the membrane 1550 could be sealed by tying a knot, clamping it shut, or by heat sealing it.

After the membrane 1550 is reversed around the substrate 1520 and dielectric tape 1526 and sealed, a single predetermined cycle of pressure, temperature, and time are applied to the substrate 1520 and dielectric tape 1526, to laminate the dielectric tape 1526 to the substrate 1520. The membrane 1550 helps facilitate a uniform application of pressure to the outer surface of the dielectric tape 1526. If caps (not shown) were optionally inserted into the ends 1517, 1519 of the cylindrical substrate 1520, they would help facilitate a uniform application of pressure to the outer surface of the dielectric tape 1526 near the ends 1517, 1519. Such a uniform application of pressure causes the dielectric tape 1526 to be laminated to the substrate 1520 with a substantially uniform thickness and adhesion.

The cycle of pressure, temperature, and time may be applied using an isostatic press, or the cycle may be applied in another suitable manner. By way of example, other suitable ways of applying the cycle could include use of a hydraulic or hydrostatic press. An isostatic press subjects a component to both temperature and isostatic pressure in a high pressure containment vessel. The medium used to apply the pressure could be an inert gas, such as Argon, a liquid, such as water, or any other suitable medium. The pressure being isostatic, it is applied to the component from all directions.

In one form, the pressure to be applied is in the range of about 50 to about 10,000 psi (pounds per square inch), the temperature to be applied is in the range of about 40 to about 110° C., and the amount of time in the cycle for applying the temperature and pressure is in the range of about 5 seconds to about 10 minutes. The particular pressure, temperature, and time to be applied depend on the size of the parts and the characteristics of the materials. After the cycle is completed, the substrate 1520 may be removed from the membrane 1550. Thereafter, the substrate 1520 with the attached dielectric tape 1526 is preferably fired in a furnace. As referred to herein, the firing process could comprise multiple stages, such as, by way of example, a separate burn out and firing process.

Figure 14A:
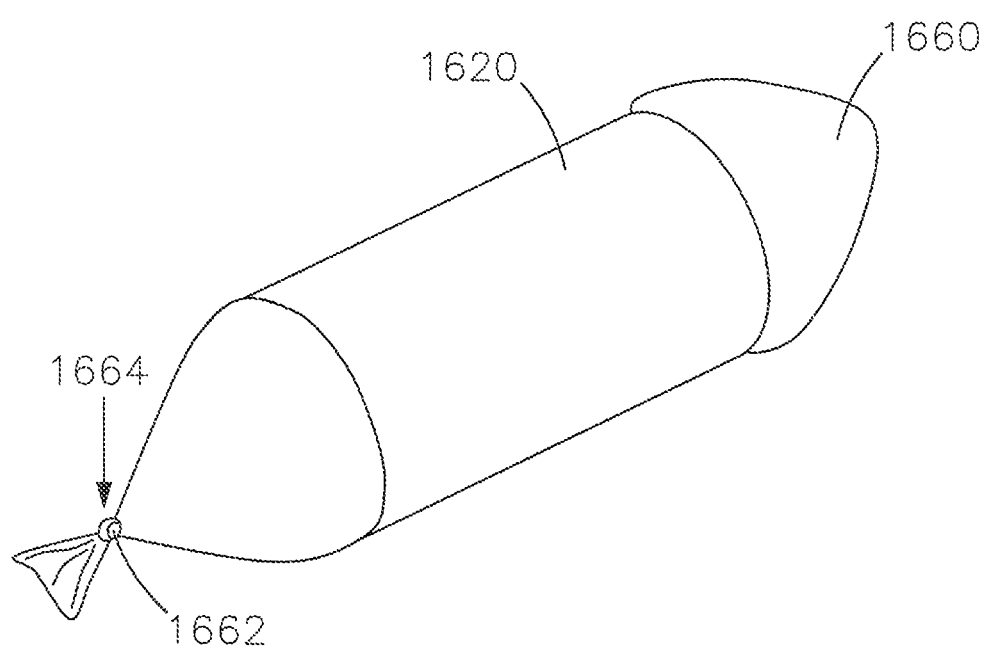
FIG. 14A is a perspective view of a medium-filled mandrel disposed in a tubular substrate in accordance with another process of the present disclosure.
Figure 14B:
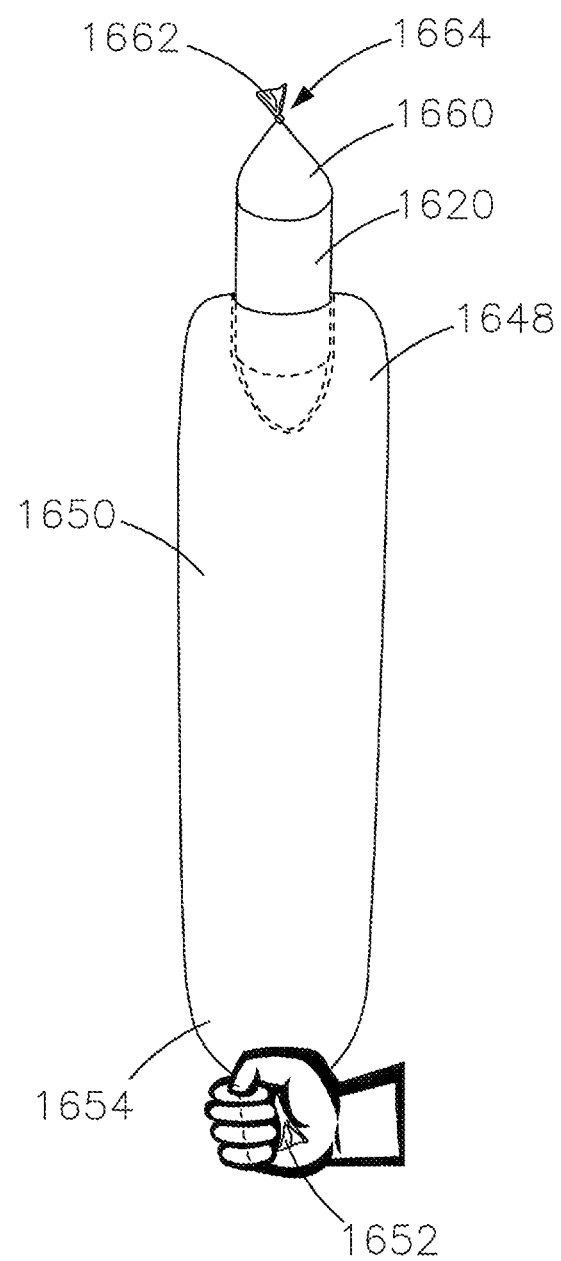
FIG. 14B is a perspective snap-shot view of the medium-filled mandrel and tubular substrate of FIG. 14A being inserted into a distal end of an inflated membrane in accordance with the process of the present disclosure.
Figure 14C:
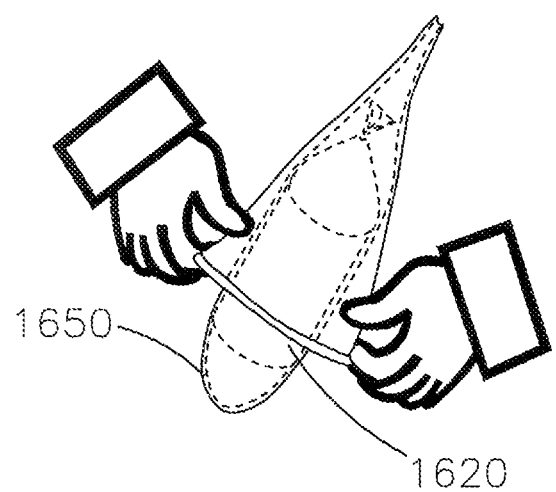
FIG. 14C is a perspective snap-shot view of the inflated membrane of FIG. 14B being reversed around the medium-filled mandrel and tubular substrate in accordance with the process of the present disclosure.

Now, with reference to FIGS. 14A-14C, a variation of the above-described process is disclosed. The process of FIGS. 14A-14C may be used to laminate a dielectric tape layer to an inside surface of a cylindrical substrate 1620 (the process of FIGS. 13A-13D was used to laminate a dielectric tape layer 1526 to an exterior surface of a cylindrical substrate 1520).

The process of FIGS. 14A-14C involves locating the dielectric tape layer on the inner surface of a hollow, cylindrical substrate 1620. With reference to FIG. 14A, an expandable mandrel 1660 comprising a fluid medium is inserted into the hollow center of the cylindrical substrate 1620 in a collapsed state. The mandrel 1660 then moves to an expanded state, either automatically or manually, causing the mandrel 1660 to move into an expanded state. In the expanded state, the mandrel 1660 conforms to the inside surface of the substrate 1620.

The mandrel 1660 is preferably filled with a fluid medium; however, the mandrel could alternatively be filled with any other suitable medium, while remaining within the spirit and scope of the present disclosure. More preferably, the mandrel 1660 is filled with a fluid selected from the following list: rubber, clay, water, air, oil, or a starch-based modeling compound, such as that which is disclosed in U.S. Pat. No. 6,713,624 and sold under the trademark Play-Doh®.

The mandrel 1660 is preferably elastically conformable. As used herein, the term "elastically conformable" shall be construed to mean that the mandrel 1660 returns to its original shape without undergoing plastic deformation such that no noticeable or substantial defects are present in the outer surface of the mandrel from the surface of the dielectric material after processing. The mandrel 1660 may comprise a membrane, such as a balloon, as its outer surface, or the mandrel 1660 may have an outer surface formed of any suitable material. If the mandrel 1660 comprises a membrane as its outer surface, as shown in FIGS. 14A-14B, the mandrel 1660 may have a knot 1662 tied at an end 1664 proximal to its opening, to ensure retention of the fluid medium within the mandrel 1660. It should be understood that the mandrel 1660 could also or alternatively be sealed in any other suitable manner, such as by clamping it shut, by heat sealing it, or by providing it without openings (in other words, forming the membrane around the medium during the process of manufacturing the membrane).

With reference to FIG. 14B, the substrate 1620, having the mandrel 1660 conforming to its inner surface and holding the dielectric tape thereto, is placed onto a distal outer surface 1648 of an inflatable membrane 1650 and inserted into the membrane 1650 as the membrane 1650 is deflated. The membrane 1650 is deflated from an opening 1652 at a proximal end 1654 of the membrane 1650. When the substrate 1620 and mandrel 1660 are completely surrounded by the membrane 1650, the membrane 1650 may be completely deflated.

With reference to FIG. 14C, the membrane 1650 is reversed around the substrate 1620. In other words, after the membrane 1650 is deflated, but before it is reversed, two layers of the membrane 1650 surround the sides of the substrate 1620; the outer layer is then reversed around the substrate 1620 so that only one layer of the membrane 1650 surrounds the sides of the substrate 1620. A portion of membrane 1650 may be cut off at the proximal end 1654 to help reverse the membrane 1650 around the substrate 1620.

After the membrane 1650 is reversed around the substrate 1620, mandrel 1660, and dielectric tape (not shown), a single predetermined cycle of pressure, temperature, and time is applied to the substrate 1620, mandrel 1660, and dielectric tape to laminate the dielectric tape to the substrate 1620 in a manner substantially the same as that described above with reference to FIGS. 13A-13C. The membrane 1650 helps facilitate a uniform application of pressure to the outer surface of the dielectric tape. Such a uniform application of pressure causes the dielectric tape to be laminated to the substrate 1620 with a substantially uniform thickness and adhesion. The cycle of pressure, temperature, and time may be applied using an isostatic press, or the cycle may be applied in another suitable manner. After the cycle is completed, the substrate 1620 may be removed from the membrane 1650. Thereafter, the substrate 1620 with the attached dielectric tape is preferably fired in a furnace.

Figure 15A:
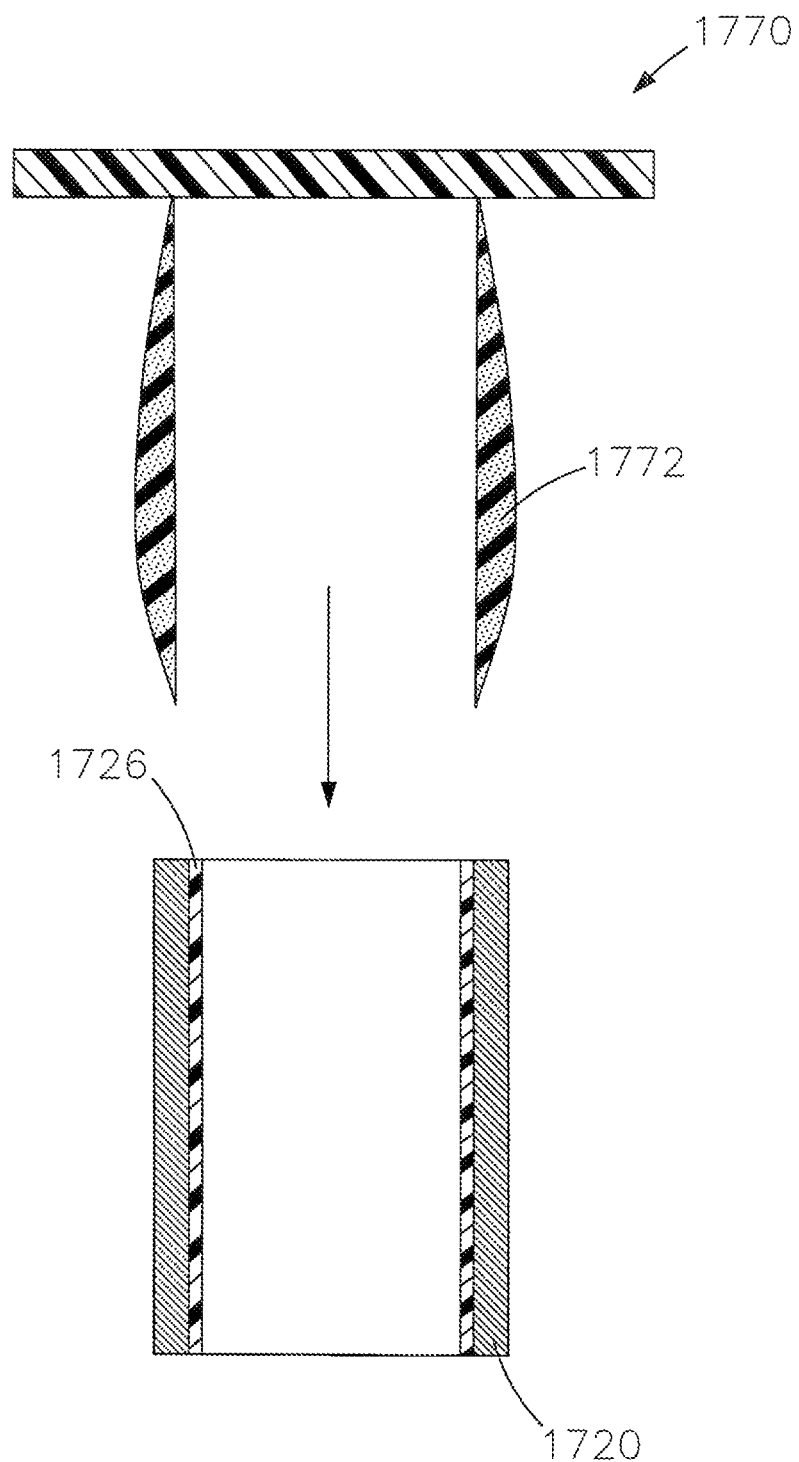
FIG. 15A is a schematic sectional view of a first bladder assembly in a collapsed state and a tubular substrate having dielectric tape disposed on its interior surface in accordance with yet another process of the present disclosure.

Now, with reference to FIGS. 15A-15F, a process of using a bladder press to laminate dielectric tape to a surface of a substrate is illustrated. With reference to FIG. 15A, a single layer of dielectric tape 1726 is placed on at least one surface of a cylindrical substrate 1720. A first assembly 1770 is moved toward the substrate 1720. The first assembly 1770 has a first bladder 1772, which is moveable between an expanded state and a collapsed state. As the first assembly 1770 is moved toward the substrate 1720, the first bladder 1772 should be in the collapsed state.

Figure 15B:
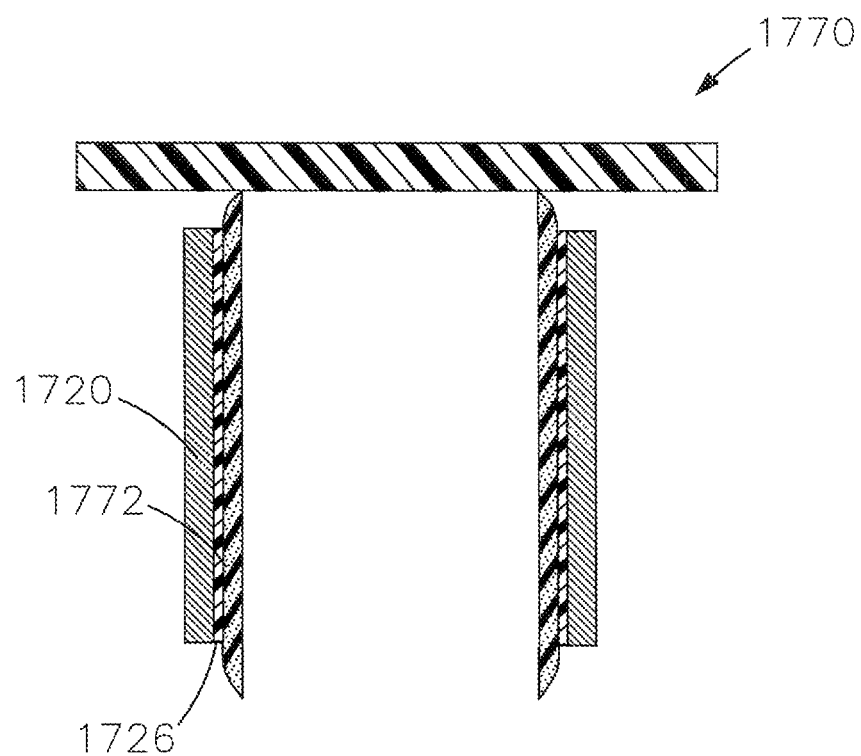
FIG. 15B is a schematic sectional view of the first bladder assembly and tubular substrate of FIG. 15A, showing the collapsed first bladder inserted in the tubular substrate in accordance with the process of the present disclosure.
Figure 15C:
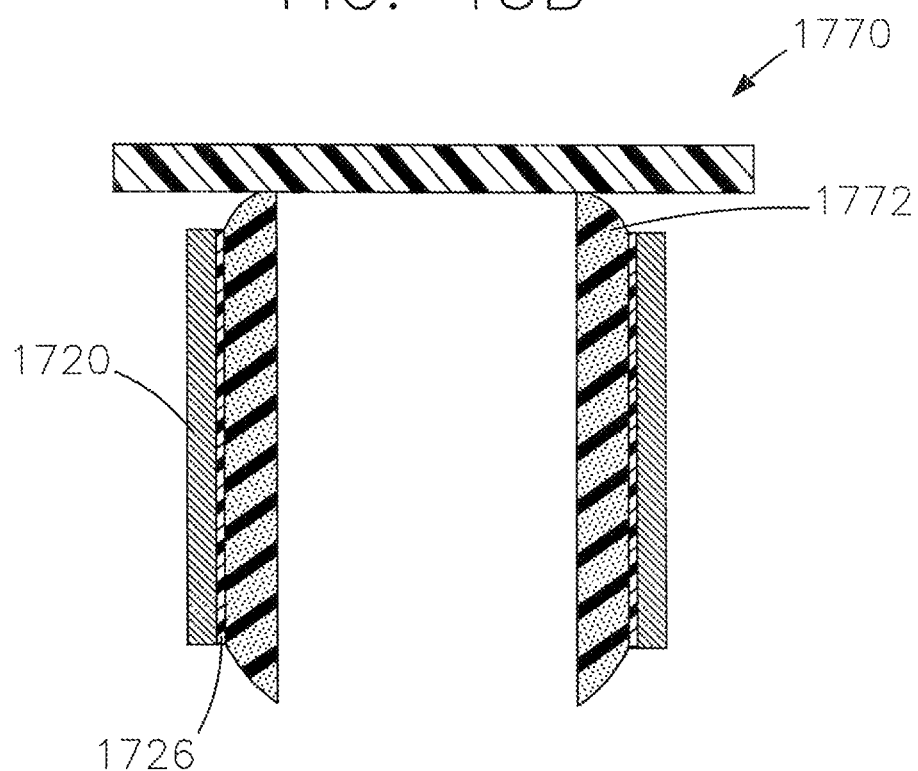
FIG. 15C is a schematic sectional view of the first bladder assembly and tubular substrate of FIGS. 15A-15B, showing the first bladder in an expanded state in accordance with the process of the present disclosure.

With reference to FIG. 15B, the first bladder 1772 is inserted into the center of the cylindrical substrate 1720. With reference to FIG. 15C, a fluid medium is released or inserted into the first bladder 1772 to inflate the first bladder 1772 into the expanded state. The fluid medium may comprise water, air, or any other suitable medium. When in the expanded state and inserted into the center of the cylindrical substrate 1720, the first bladder 1772 is tightly pressed up against the inner surface of the substrate 1720, such that when the first assembly 1770 is moved, the substrate 1720 will move with the first assembly 1770 or be lifted by the first assembly 1770. In other words, in the expanded state the first bladder 1772 engages the substrate 1720 to clench the substrate 1720 to the first bladder 1772.

Figure 15D:
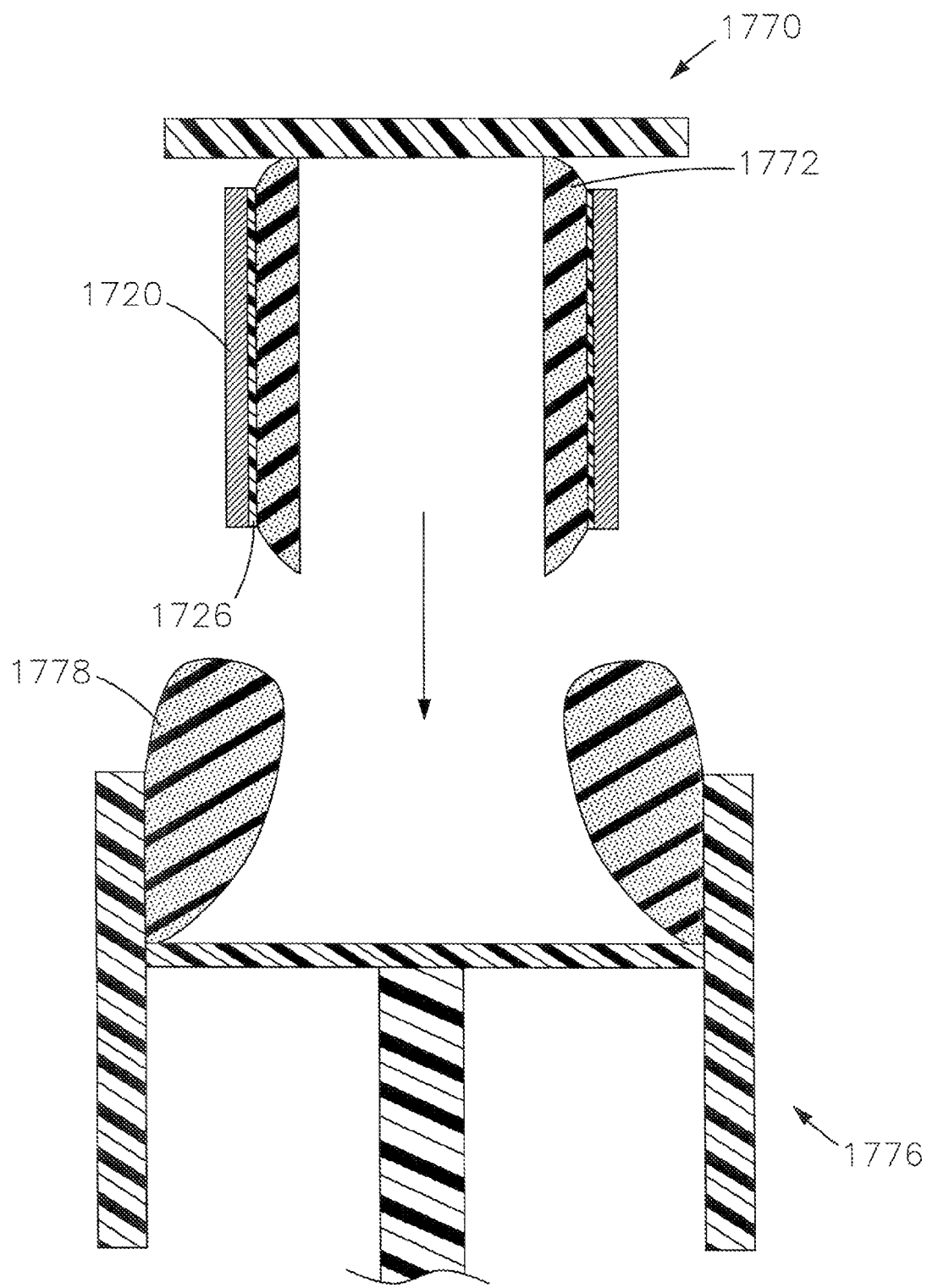
FIG. 15D is a schematic sectional view of the first bladder assembly and tubular substrate of FIGS. 15A-15C, showing the first bladder engaging and clenching the tubular substrate, and showing a second bladder assembly disposed therebelow in accordance with the process of the present disclosure.

With reference to FIG. 15D, the first assembly 1770 and attached substrate 1720 are moved toward a second assembly 1776. The second assembly 1776 has a second bladder 1778, which is moveable between a collapsed state and an expanded state. As the first assembly 1770 is moved toward the second assembly 1776, the second bladder 1778 should be in the collapsed state.

Figure 15E:
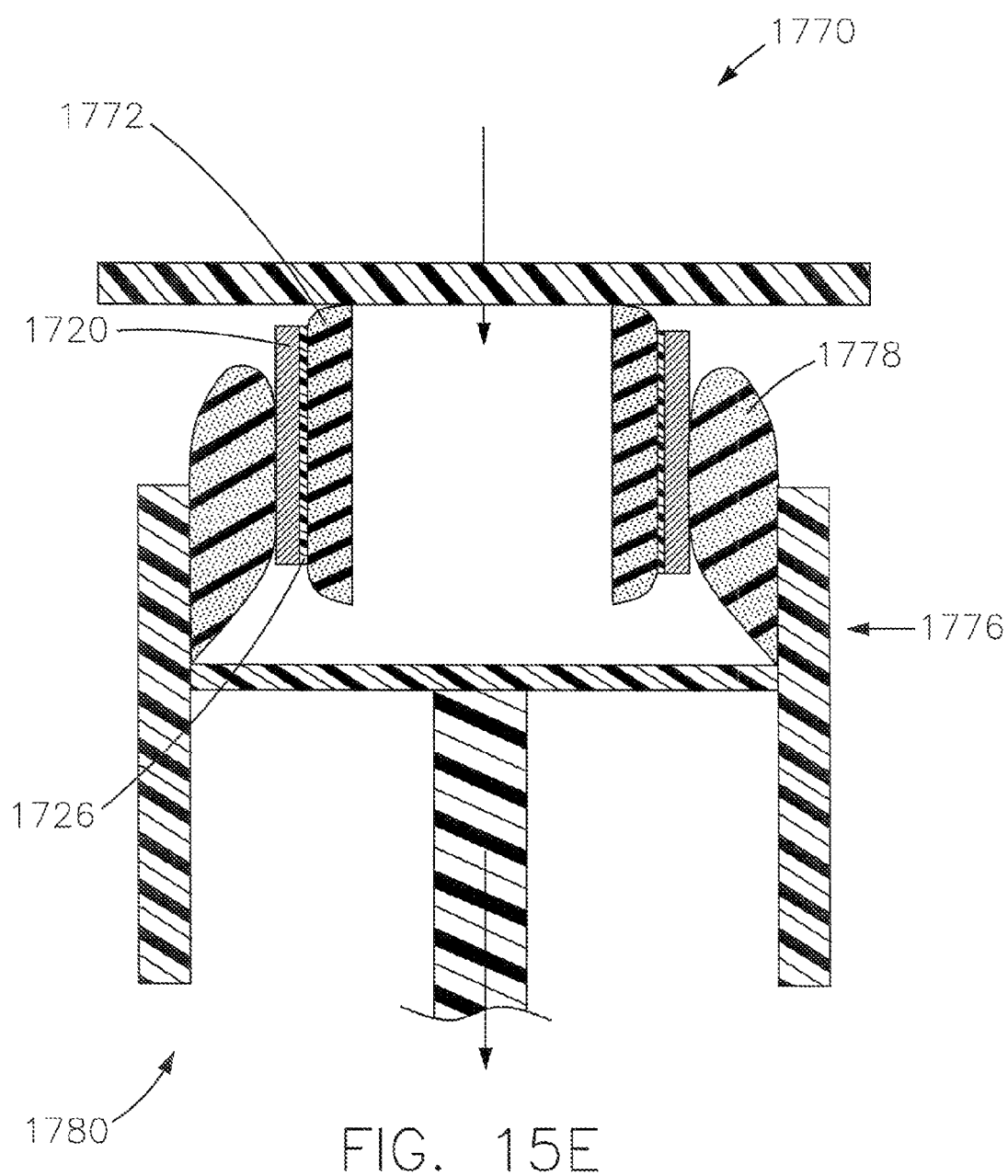
FIG. 15E is a schematic sectional view of the bladder assemblies and tubular substrate of FIG. 15D, showing the tubular substrate and first bladder being inserted into the second bladder assembly, the second bladder being in a collapsed state in accordance with the process of the present disclosure.
Figure 15F:
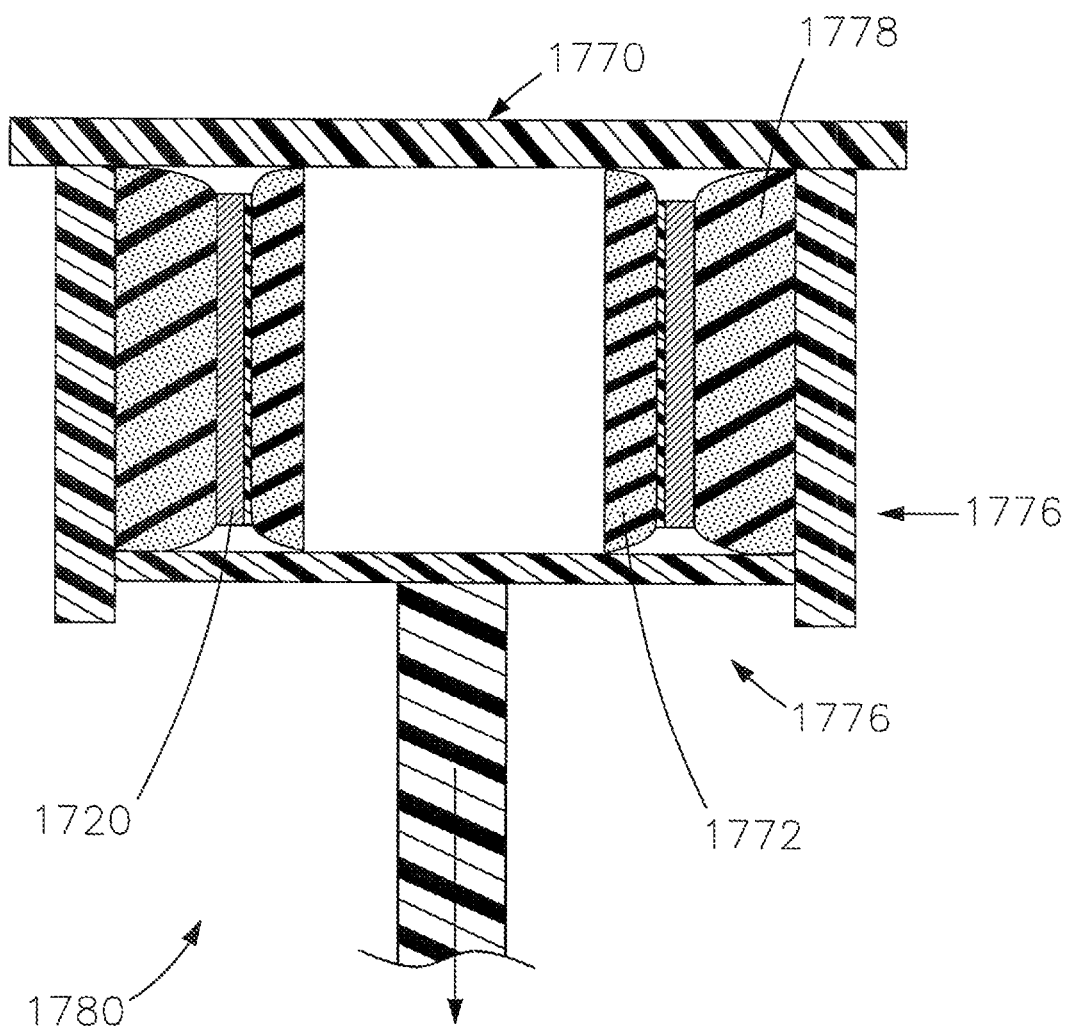
FIG. 15F is a schematic sectional view of the bladder assemblies and tubular substrate of FIGS. 15D-15E, showing both bladders being in an expanded state in accordance with the process of the present disclosure.

With reference to FIG. 15E, the substrate 1720 is inserted into the second assembly 1776 while the first assembly 1770 remains attached to the substrate 1720 and the first bladder 1772 remains in the expanded state. With reference to FIG. 15F, a fluid medium, such as air or water, is released or inserted into the second bladder 1778 to inflate the second bladder 1778 into the expanded state. In the expanded state, the second bladder 1778 engages the outer surface of the substrate 1720. If dielectric tape is provided on the outer surface of the substrate 1720, the second bladder 1778 engages the dielectric tape to press it against the outer surface of the substrate 1720, in the expanded state.

The entire assembly 1780, including the first assembly 1770, the second assembly 1776, and the substrate 1720, is enclosed in a pressurized vessel. A single, predetermined cycle of pressure, temperature, and time is applied in the ranges that have been previously described. The bladders 1772, 1778 are maintained in the expanded states through a single cycle of pressure, temperature, and time. After the substrate 1720 is removed from the assembly 1780, the substrate 1720 with the attached dielectric layer is preferably fired in a furnace.

Figure 15G:
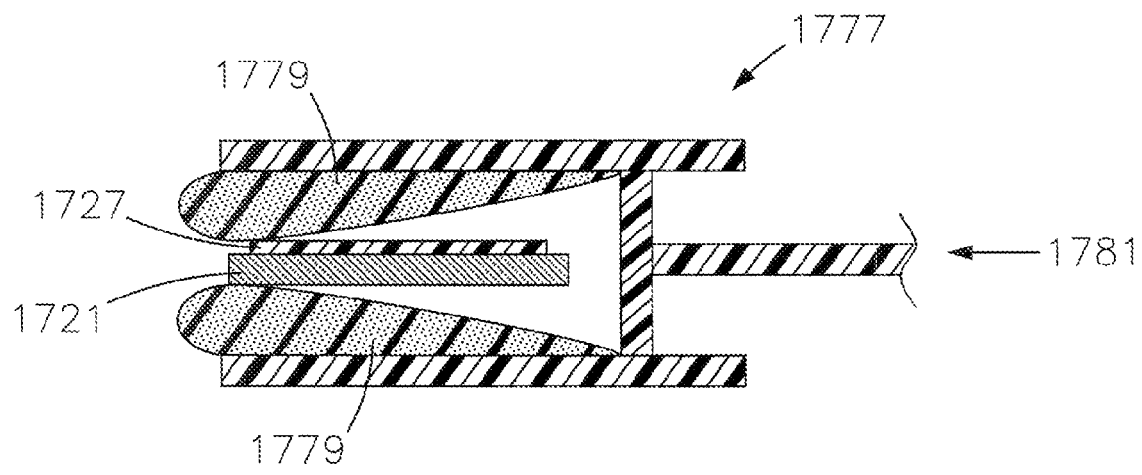
FIG. 15G is a schematic sectional view of another bladder assembly in a collapsed state having a flat substrate and dielectric tape inserted therein, in accordance with the principles of the present invention.
Figure 15H:
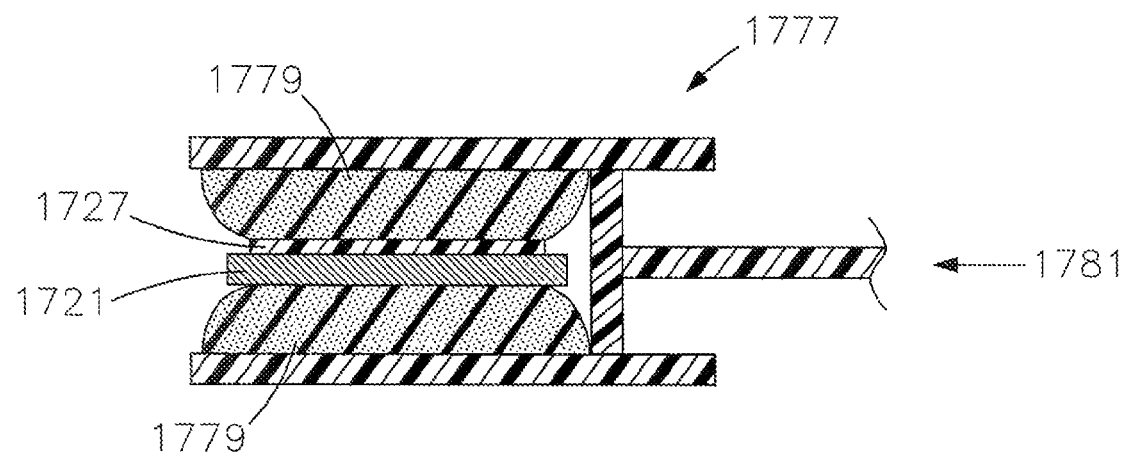
FIG. 15H is a schematic sectional view of the bladder assembly, substrate, and dielectric tape of FIG. 15G, the bladder assembly being in an expanded state.

With reference to FIG. 15G-15H, another process of using a bladder press to laminate dielectric tape to a substrate is illustrated. With reference to FIG. 15G, a single layer of dielectric tape 1727 is placed on at least one surface of a substrate 1721. The substrate 1721 shown in FIG. 15G-15H is a flat substrate 1721, however, it should be understood that the substrate 1721 could have other configurations without falling beyond the spirit and scope of the present invention.

The substrate 1721 and dielectric tape 1727 are placed into a bladder assembly 1777 between bladders 1779. The bladders 1779 are moveable between a collapsed state and an expanded state. As the substrate is moved into the bladder assembly 1777, the bladders 1779 should be in the collapsed state.

With reference to FIG. 15H, a fluid medium comprising air, water, or any other suitable medium is released or inserted into the bladders 1779 to inflate the bladders 1779 into the expanded state. When in the expanded state, the bladders 1779 engage the dielectric tape 1727 and substrate 1721 to press the dielectric tape 1727 against the surface(s) of the substrate 1721. The entire assembly 1781, including the bladder assembly 1777, the substrate 1721, and the dielectric tape 1727, is enclosed in a pressurized vessel. A single, predetermined cycle of pressure, temperature, and time is applied in the ranges that have been previously described. The bladders 1779 are maintained in the expanded state through a single cycle of pressure, temperature, and time. After the substrate 1721 is removed from the assembly 1781, the substrate 1721 with the attached dielectric layer is preferably fired in a furnace.

Figure 16:
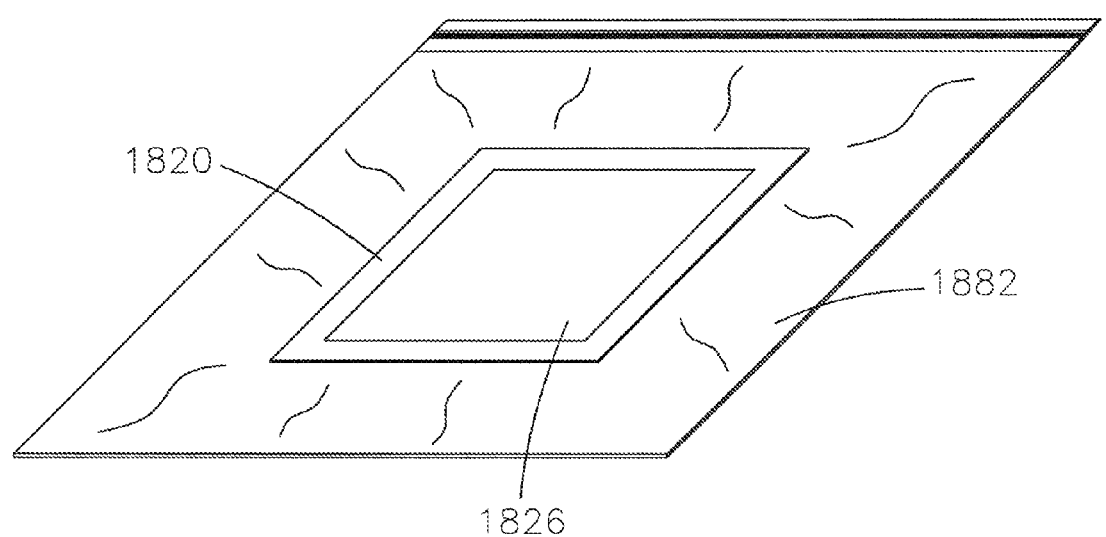
FIG. 16 is a perspective view of a flat substrate having dielectric tape disposed thereon, the substrate and dielectric tape being vacuum-sealed in accordance with another process of the present disclosure.

With reference to FIG. 16, still another process for laminating dielectric tape 1826 to a substrate 1820 is illustrated. The substrate 1820 is shown as being flat and rectangular; however, the present process is suitable for a flat substrate having any shape, such as a circular, flat substrate. The dielectric tape 1826 is located on the substrate 1820, and both are inserted into a plastic bag 1882. The bag 1882 is sealed and a vacuum is applied to, causing the bag 1882 to cling snugly against the tape layer 1826 and substrate 1820. A backing plate could also be inserted on either or both sides of the dielectric tape 1826 or the substrate 1820 to help facilitate an even distribution of pressure. Further, the backing plate could allow for multiple substrates 1820 to be inserted into the bag 1882. In that form, each substrate 1820, having dielectric tape 1826 disposed thereon, would be stacked with a backing plate separating it from each other substrate 1820. Thereafter, a cycle of pressure, temperature, and time may be applied to the substrate 1820 within the bag 1882, applying the parameters previously described, to laminate the dielectric tape 1826 to the substrate 1820. An isostatic press may, but need not, be used to apply the cycle of pressure, temperature, and time. Thereafter, the substrate 1820 with the attached dielectric layer is preferably fired in a furnace.

With reference to FIGS. 17A-17B, another process for laminating a dielectric tape layer to an inner surface of a substrate 1920 is illustrated. The process involves locating a pre-cut piece of dielectric tape on the inner surface of the substrate 1920. With reference to FIG. 17A, the process further includes inserting a rubber mandrel 1960 within the substrate 1920. The mandrel 1960 could be pre-heated to help facilitate the laminating process. Also or in the alternative, the substrate 1920 and/or dielectric tape could be preheated using an oven. With reference to FIG. 17B, the process includes applying a force to the rubber mandrel 1960 by sandwiching the mandrel 1960 between a force-applying surface 1984 and a reaction surface 1986. Alternatively, both surfaces 1984, 1986 could apply force to the mandrel 1960. Temperature could be added at this time and the force could be applied for an appropriate period of time. Thereafter, the substrate 1920 with the attached dielectric layer is preferably fired in a furnace.

With reference to FIGS. 18A-18B, a process for laminating a dielectric tape layer 2026 to a flat substrate 2020 is illustrated. The dielectric tape layer 2026 is laminated to the substrate 2020 using thermal rollers or dies 2090. The substrate 2020 and dielectric tape layer 2026 are preferably preheated using an oven, such as a small batch oven. The substrate 2020 and dielectric tape layer 2026 are preferably heated to a temperature in the range of about 40 to about 110° C.; however, the preferred temperature varies for different materials. The dielectric tape layer 2026 is located on the substrate 2020, and rolled through a set of dies 2090. Dielectric tape layers 2026 could be located on one or both sides of the substrate 2020. The rollers or dies 2090 are preferably heated to a temperature in the range of about 40 to 110° C., and more preferably to about 110° C. In one form, a Mylar® sheet (not shown) could be placed between the dies 2090 and the substrate 2020. After being laminated by the set of dies 2090, the substrate 2020 with the attached dielectric layer 2026 is preferably fired in a furnace.

With reference to FIGS. 19A-19B, another process for laminating a dielectric tape layer 2126 to a substrate 2120 is illustrated. In this form, the substrate 2120 has a tubular shape, which may or may not have a slot or notch. The substrate 2120 and dielectric tape layer 2126 are preferably preheated using an oven, such as a small batch oven, to a temperature in the range of about 40 to about 110° C.; however, the preferred temperature varies for different materials. The dielectric tape layer 2126 is located on the substrate 2120, and the substrate 2120 is slid onto a roller or die 2190. The rollers 2190 are then closed, and the substrate 2120 and dielectric tape layer 2126 are rolled through the rollers 2190. The rollers or dies 2190 are preferably heated to a temperature in the range of about 40 to 110° C., and more preferably to about 110° C. In one form, a Mylar® sheet (not shown) could be placed between the dies 2190 and the substrate 2120. After being laminated by the set of dies 2190, the substrate 2120 with the attached dielectric layer 2126 is preferably fired in a furnace.

In the various processes described above, a resistive layer may be added to the dielectric tape layer after the tape layer is laminated to the substrate. The resistive layer may be formed on the dielectric layer using a layered process such as thin film, thick film, thermal spray, or sol-gel, all of which have been described above.

A protective layer may then be formed on the resistive layer by a layered process such as thin film, thick film, thermal spray, or sol-gel. Alternatively, the protective layer may be a thick film dielectric tape, which may be applied by the processes described in connection with FIGS. 13A-19B. In other words, the protective layer may be a dielectric tape layer that is laminated to the resistive layer.

As an alternative to applying the resistive and protective layers after the dielectric tape layer has been laminated to the substrate or target, the resistive layer, the protective layer, and/or conductors may be preformed on the dielectric tape layer. In other words, the resistive layer, protective layer, and/or conductors could be formed on the dielectric tape before it is laminated to a substrate or target. In this form, notches, cut-outs, or slots could also be pre-cut into or through the dielectric tape layer(s) and any other functional layers attached thereto.

The present disclosure is merely exemplary in nature and, thus, variations that do not depart from the gist of the disclosure are intended to be within the scope of the present disclosure. Such variations are not to be regarded as a departure from the spirit and scope of the present disclosure.

What is claimed is:

1. A process of forming a resistive device comprising:
   placing a dielectric layer onto a substrate, the dielectric layer defining a single layer of dielectric tape,
   providing an expandable mandrel having a conformable membrane;
   completely surrounding the substrate and the single layer of dielectric tape with the conformable membrane;
   laminating the dielectric tape on the substrate through a single predetermined cycle of pressure, temperature and time using the expandable mandrel to provide a uniform application of pressure to an outer surface of the dielectric tape, wherein uniform application of pressure causes the dielectric tape to be laminated to the substrate with a uniform thickness and adhesion;
   forming a resistive layer on the dielectric layer after the dielectric layer is adhered to the substrate; and
   forming a protective layer over the resistive layer.

2. The process according to claim 1, wherein the conformable membrane is filled with a fluid medium.

3. The process according to claim 2, wherein the fluid medium is selected from the group consisting of rubber, clay, water, air, oil, and starch-based modeling compound.

4. The process according to claim 1, wherein the expandable mandrel is elastically conformable.

5. The process according to claim 1, wherein the resistive layer is formed by a layered process selected from the group consisting of thin film, thick film, thermal spray, and sol-gel.

6. The process according to claim 1, wherein the protective layer comprises a single layer of dielectric tape, the dielectric tape being laminated to the resistive layer through a single predetermined cycle of pressure, temperature and time.

7. A process of forming a resistive device comprising:
   placing a dielectric layer defining a single layer of dielectric tape onto a substrate;
   providing an expandable mandrel having a conformable membrane;
   completely surrounding the substrate and the single layer of dielectric tape with the conformable membrane;
   laminating the dielectric tape on the substrate through a single predetermined cycle of pressure, temperature and time using the expandable mandrel to provide a uniform application of pressure to an outer surface of the dielectric tape, wherein uniform application of pressure causes the dielectric tape to be laminated to the substrate with a uniform thickness and adhesion;
   forming a resistive layer on the dielectric layer using a thick film layering process after the dielectric tape is adhered to the substrate; and
   laminating a protective layer comprising a single layer of dielectric tape over the resistive layer through a subsequent single predetermined cycle of pressure, temperature and time.

8. The process according to claim 7 further comprising forming conductors in electrical contact with the resistive layer, wherein the conductors are at least partially exposed through the protective layer.

9. The process according to claim 7, wherein the expandable mandrel is elastically conformable.

* * * * *